United States Patent
Durel et al.

(10) Patent No.: US 7,217,751 B2
(45) Date of Patent: May 15, 2007

(54) TIRE AND TREAD COMPRISING A BIS-ALKOXYSILANE TETRASULFIDE AS COUPLING AGENT

(75) Inventors: Olivier Durel, Clermomt-Ferrand (FR); Roland Rauline, Durtol (FR); Nathalie Guennouni, Irigny (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 339 days.

(21) Appl. No.: 10/681,894

(22) Filed: Oct. 9, 2003

(65) Prior Publication Data
US 2004/0132880 A1    Jul. 8, 2004

Related U.S. Application Data

(63) Continuation of application No. PCT/EP02/03774, filed on Apr. 5, 2002.

(30) Foreign Application Priority Data
Apr. 10, 2001    (FR) .................................. 01 05005

(51) Int. Cl.
*B60C 1/00*    (2006.01)
(52) U.S. Cl. ..................................... 524/262
(58) Field of Classification Search ................. 524/262
See application file for complete search history.

(56) References Cited

U.S. PATENT DOCUMENTS 3,873,489 A * 3/1975 Thurn et al. ................. 524/262

5,650,457 A * 7/1997 Scholl et al. ................ 524/262

* cited by examiner

*Primary Examiner*—Peter D. Mulcahy
(74) *Attorney, Agent, or Firm*—Buchanan Ingersoll & Rooney PC

(57) ABSTRACT

A tire or tire tread incorporating an elastomeric composition having improved vulcanization kinetics, based on at least a diene elastomer, a reinforcing inorganic filler and, as (inorganic filler/elastomer) coupling agent, a bis-alkoxysilane tetrasulfide of the formula:

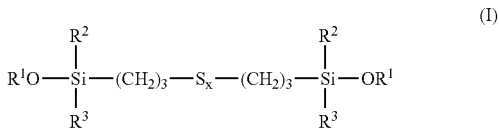

in which:
the symbols $R^1$, which may be identical or different, each represent a monovalent hydrocarbon group selected from among the group consisting of alkyls, whether straight-chain or branched, having from 1 to 4 carbon atoms, and alkoxyalkyls, whether straight-chain or branched, having from 2 to 8 carbon atoms;
$R^2$ and $R^3$, which may be identical or different, each represent a monovalent hydrocarbon group selected from among the group consisting of alkyls, whether straight-chain or branched, having from 1 to 6 carbon atoms, and the phenyl radical; and
x is between about 3 and about 5.

39 Claims, 2 Drawing Sheets

TIRE AND TREAD COMPRISING A BIS-ALKOXYSILANE TETRASULFIDE AS COUPLING AGENT

CROSS REFERENCE TO RELATED APPLICATIONS

This application is a continuation of international application PCT/EP02/03774 filed on 05 Apr. 2002, currently pending, which published in French as WO02/083782 on 24 Oct. 2002. The present application, by way of the international application, claims priority to French application FR01/05005, which was filed on 10 Apr. 2001.

BACKGROUND OF THE INVENTION

The present invention relates to tires and to treads for tires incorporating diene elastomer compositions reinforced with a white or inorganic filler.

It relates in particular to the coupling agents used for coupling reinforcing inorganic fillers and diene elastomers in such tires or tire treads.

It is known that generally, in order to obtain the optimum reinforcement properties imparted by a filler in a tire, in particular in a tread of such a tire, the filler should be present in the elastomeric matrix in a final form which is both as finely divided as possible and distributed as homogenously as possible. Now, such conditions may only be obtained insofar as the filler has a very good ability firstly to be incorporated into the matrix during mixing with the elastomer and to disagglomerate, and secondly to be dispersed homogenously in this matrix.

It is fully known that carbon black has such abilities, which is generally not true of inorganic fillers, because, for reasons of mutual attraction, the inorganic filler particles have an irritating tendency to agglomerate together within the elastomeric matrix. These interactions have the harmful consequence of limiting the dispersion of the filler and hence the reinforcing properties to a substantially lower level than that which it would be theoretically possible to achieve if all the (inorganic filler/elastomer) bonds that could be created during the mixing operation were in fact obtained; these interactions furthermore tend to increase the consistency of the rubber compositions in the uncured state and therefore to make them more difficult to work ("processability") than in the presence of carbon black.

Since fuel economies and the need to protect the environment have become priorities, it has however proved necessary to produce tires having reduced rolling resistance, without adversely affecting their wear resistance.

This has been made possible in particular due to the use, in tires or treads for these tires, of new rubber compositions reinforced with specific inorganic fillers referred to as "reinforcing" fillers, which are capable of rivalling a conventional tire-grade carbon black from the reinforcing point of view. At the same time, these compositions offer a lower hysteresis, which is synonymous with less rolling resistance for the tires comprising them, and also improved grip on wet, snow-covered or icy ground.

Tires or treads for tires incorporating rubber compositions reinforced with reinforcing inorganic fillers of the siliceous or aluminous type have in particular been described in patents or patent applications EP-A-501 227 or U.S. Pat. No. 5,227,425, EP-A-735 088 or U.S. Pat. No. 5,852,099, EP-A-810 258 or U.S. Pat. No. 5,900,449, WO 99/02590, WO 00/05300, WO 00/05301 and WO 02/10269.

Mention will be made in particular of documents EP-A-501 227 and EP-A-735 088, which disclose tires or tire treads incorporating diene rubber compositions reinforced with precipitated silicas of high dispersibility, having a low hysteresis and a distinctly reduced rolling resistance, without other properties, in particular those of grip, endurance and above all of wear resistance, being adversely affected. Tires or treads having such a compromise of contradictory properties are also described in application EP-A-810 258, with specific aluminas of high dispersibility as reinforcing inorganic fillers.

Although the use of these specific inorganic fillers as reinforcing fillers has reduced the difficulties of processing the rubber compositions that contain them, they are still more difficult to process than for rubber compositions filled conventionally with carbon black.

In particular, it is necessary to use a coupling agent, also referred to as bonding agent, the function of which is to provide the connection or bond between the surface of the particles of inorganic filler and the elastomer, while facilitating the dispersion of this inorganic filler within the elastomeric matrix.

It will be recalled that here that (inorganic filler/elastomer) "coupling agent" is to be understood to mean, in known manner, an agent capable of establishing a sufficient chemical and/or physical bond between the inorganic filler and the diene elastomer; such a coupling agent, which is at least bifunctional, has, for example, the simplified general formula "Y-A-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the diene elastomer, for example by means of a sulfur atom;

A represents a divalent group making it possible to link Y and X.

The coupling agents must particularly not be confused with simple agents for covering the inorganic filler which, in known manner, may comprise the "Y" function which is active with respect to the inorganic filler but are devoid of the "X" function which is active with respect to the diene elastomer.

Coupling agents, in particular (silica/diene elastomer) coupling agents, have been described in a large number of documents, the best known being bifunctional organosilanes bearing alkoxyl functions (that is to say, by definition, "alkoxysilanes") as "Y" functions and, as "X" functions, functions capable of reacting with the diene elastomer, such as, for example, sulfur functions (i.e. comprising sulfur).

Thus, it was proposed in patent applications FR-A-2 094 859 or GB-A-1 310 379 to use a mercaptoalkoxysilane coupling agent for manufacturing treads for tires. It was quickly shown, and is today well known, that such mercaptosilanes are capable of giving excellent silica/elastomer coupling properties, but that these coupling agents cannot be used industrially because of the very high reactivity of the thiol-type sulfur functions —SH ("X" functions), which very rapidly results, during the preparation of the rubber compositions, in an internal mixer, in premature vulcanization, this also being known as "scorching", in very high viscosities in the uncured state, and, finally, in rubber compositions which are virtually impossible to work and process industrially. To illustrate this problem, mention may be made for example of documents FR-A-2 206 330, U.S. Pat. No. 3,873,489 and U.S. Pat. No. 4,002,594.

To overcome this drawback, it was then proposed to replace these mercaptoalkoxysilanes by polysulfurized alkoxysilanes, in particular bis-(alkoxysilylalkyl) polysulfides such as described in very large numbers of documents (see for example FR-A-2 149 339, FR-A-2 206 330, U.S. Pat. No. 3,842,111, U.S. Pat. No. 3,873,489 or U.S. Pat. No. 3,997,581).

Among all these polysulfides, mention must be made in particular of bis-(trialkoxysilylpropyl) polysulfides, most particularly bis-3-triethoxysilylpropyl tetrasulfide (abbreviated to TESPT).

It will be recalled that TESPT, of the formula $[(C_2H_5O)_3Si(CH_2)_3S_2]_2$, is sold in particular by Degussa under the name Si69 (or X50S when it is supported to 50% by weight on carbon black), or alternatively by Osi Specialties under the name Silquest A1289 (in both cases, in the form of a commercial mixture of polysulfides $S_x$ having an average value of x which is close to 4).

This polysulfurized alkoxysilane TESPT is today considered as being the product providing, for tires or tire treads reinforced by a reinforcing inorganic filler such as silica, the best compromise in terms of resistance to scorching, hysteresis and reinforcing ability. It is therefore the coupling agent of reference for the person skilled in the art for tires filled with silica of low rolling resistance, sometimes referred to as "Green Tires" because of the energy saving offered (or "energy-saving Green Tires"). To be convinced of this, it is enough to consult the very large numbers of publications relating to these tires based on silica and TESPT.

The elastomeric compositions based on reinforcing inorganic filler such as silica and polysulfurized alkoxysilane coupling agent such as TESPT however have the known drawback of having very substantially slower vulcanization kinetics, as a general rule by a factor of two to three, compared with the conventional compositions filled with carbon black.

It is known that the longer curing times which result adversely affect the industrial processing of tires or treads for tires based on reinforcing inorganic fillers.

BRIEF SUMMARY OF THE INVENTION

Now, the Applicants have discovered during their research that a specific organosilane, in this case a special polysulfurized alkoxysilane, unexpectedly makes it possible to overcome this drawback relating to the vulcanization kinetics; owing to this specific organosilane, curing times substantially identical to those of conventional compositions based on carbon black become accessible.

What is more, this important result is obtained without adversely affecting, and even in many cases with an improvement in, the coupling and reinforcement properties, thus offering the tires and their treads an overall compromise of properties never achieved hitherto with TESPT, and certainly not with the other known polysulfurized alkoxysilanes.

Consequently, a first object of the invention relates to a tire incorporating an elastomeric composition comprising at least, as base constituents, (i) a diene elastomer, (ii) a reinforcing inorganic filler and (iii) a bis-alkoxysilane tetrasulfide as (inorganic filler/diene elastomer) coupling agent, this tire being characterised in that said alkoxysilane satisfies the formula (I):

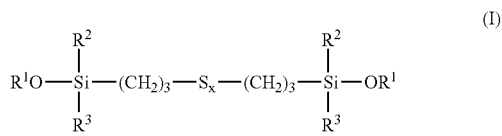

in which:
the symbols $R^1$, which may be identical or different, each represent a monovalent hydrocarbon group selected from among alkyls, whether straight-chain or branched, having from 1 to 4 carbon atoms and alkoxyalkyls, whether straight-chain or branched, having from 2 to 8 carbon atoms;
the symbols $R^2$ and $R^3$, which may be identical or different, each represent a monovalent hydrocarbon group selected from among alkyls, whether straight-chain or branched, having from 1 to 6 carbon atoms and the phenyl radical;
x is an integer or fraction of between 3 and 5.

The invention is very preferably implemented with a tetrasulfide of formula (III):

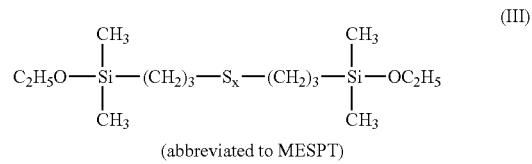

(abbreviated to MESPT)

in which x is between 3 and 5, more preferably lies within a range from 3.5 to 4.5.

It is true that polysulfurized monoalkoxysilanes of formulae I or III above had been cited very briefly, in such and such a document of the prior art, most frequently in long lists of compounds potentially usable as coupling agents (see for example U.S. Pat. No. 3,842,111, U.S. Pat. No. 4,072,701, U.S. Pat. No. 4,129,585, U.S. Pat. No. 5,684,172, U.S. Pat. No. 5,708,053 or EP-A-1 043 357).

However, to the knowledge of the Applicants, no document of the prior art describes the synthesis of such compounds of formulae (I) or (III), and certainly does not give examples of its use as coupling agent in tires or treads reinforced with inorganic fillers such as silica.

The tires of the invention are particularly intended to be fitted on passenger vehicles, 4×4 vehicles (having 4 driving wheels), two-wheeled vehicles (in particular bicycles or motorcycles), vans or "heavy vehicles" (that is to say subway trains, buses, road transport machinery such as lorries, tractors or trailers).

The object of the invention is also the treads for such tires, these treads possibly being used during the manufacture of new tires or advantageously for recapping worn tires.

Consequently, a second object of the invention relates to a tire tread, incorporating an elastomeric composition based on at least a diene elastomer, a reinforcing inorganic filler and a bis-alkoxysilane tetrasulfide as (inorganic filler/elastomer) coupling agent, this tread being characterised in that said alkoxysilane satisfies the aforementioned formula (I).

Owing to the selected coupling agent of formula (I), the treads of the invention have revealed a compromise in terms of properties which has been unequalled hitherto: reduced rolling resistance compared with using TESPT, which is synonymous with a saving in fuel, wear resistance equal to if not greater than that offered by the reference coupling agent TESPT, which is synonymous with an equal or greater mileage covered, excellent properties of grip in particular on wet, snow-covered or icy ground, typical of those liable to be provided by a reinforcing inorganic filler such as silica, and last but not least, a curing time which is very distinctly reduced, typically by a factor of two or more, compared with the TESPT.

Reduced curing times are in particular advantageous for treads intended for recapping, be it "cold" recapping (use of a precured tread) or conventional "hot" recapping (use of a tread in the uncured state). In this latter case, a reduced curing time, in addition to the fact that it reduces the production costs, limits the overcuring (or post-curing) imposed on the rest of the tire (carcass) of the worn tire (already vulcanized). Owing to the invention, with an identical curing time, the treads may also be cured at a lower temperature, which constitutes another means of preserving the carcass from the problem of overcuring mentioned above.

The tires or treads according to the invention, having improved vulcanization kinetics, incorporating a composition based on a sulfur-vulcanizable reinforcing inorganic filler, are capable of being prepared by a process comprising the following steps:

incorporating in a diene elastomer, in a mixer:
        a reinforcing inorganic filler;
        a bis-alkoxysilane tetrasulfide as (inorganic filler/diene elastomer) coupling agent,
    thermomechanically kneading the entire mixture, in one or more stages, until a maximum temperature of between 110° C. and 190° C. is reached;
    cooling the entire mixture to a temperature of less than 100° C.;
    then incorporating a vulcanization system;
    kneading the entire mixture until a maximum temperature less than 110° C. is reached;
    calendering or extruding the elastomeric composition thus obtained in the form of a tire tread or a rubber profiled element incorporated as semi-finished product in the tire, this process being characterised in that said alkoxysilane satisfies the aforementioned formula (I).

The invention also relates, per se, to the sulfur-vulcanizable elastomeric compositions usable for the manufacture of tires or of treads for tires, having accelerated vulcanization kinetics, based on at least one diene elastomer, a reinforcing inorganic filler and a bis-alkoxysilane tetrasulfide as (inorganic filler/diene elastomer) coupling agent, these compositions being characterised in that said alkoxysilane satisfies the aforementioned formula (I).

These compositions are capable of being prepared using a process which constitutes another object of the invention; this process comprises the following steps:

incorporating in a diene elastomer, in a mixer:
        a reinforcing inorganic filler;
        a bis-alkoxysilane tetrasulfide as (inorganic filler/diene elastomer) coupling agent,
    thermomechanically kneading the entire mixture, in one or more stages, until a maximum temperature of between 110° C. and 190° C. is reached;
    cooling the entire mixture to a temperature of less than 100° C.;
    then incorporating a vulcanization system;
    kneading the entire mixture until a maximum temperature less than 110° C. is reached, and it is characterised in that said alkoxysilane satisfies the aforementioned formula (I).

Another object of the invention is the use of a composition according to the invention for the manufacture of finished articles or semi-finished products, and also these finished articles and semi-finished products themselves, comprising a rubber composition according to the invention, these articles or products being intended for any ground contact system for automobiles, such as tires, internal safety supports for tires, wheels, rubber springs, elastomeric articulations and other suspension and anti-vibration elements.

A very particular object of the invention is the use of a composition according to the invention for the manufacture of tires or semi-finished rubber products intended for such tires, these semi-finished articles being selected in particular from among the group comprising treads, underlayers intended for example to be positioned beneath these treads, crown reinforcement plies, sidewalls, carcass reinforcement plies, beads, protectors, inner tubes and airtight internal rubbers for tubeless tires.

BRIEF DESCRIPTION OF THE DRAWINGS

The invention and its advantages will be readily understood in the light of the description and examples of embodiment which follow, and of the figures relating to these examples, which show curves of the variation of modulus (in MPa) as a function of the elongation (in %), recorded for rubber compositions intended for tire treads, whether or not in accordance with the invention.

DETAILED DESCRIPTION OF THE INVENTION

I. Measurements and Tests Used

I-1. Characterisation of the Alkoxysilane Polysulfides

Figure 1:
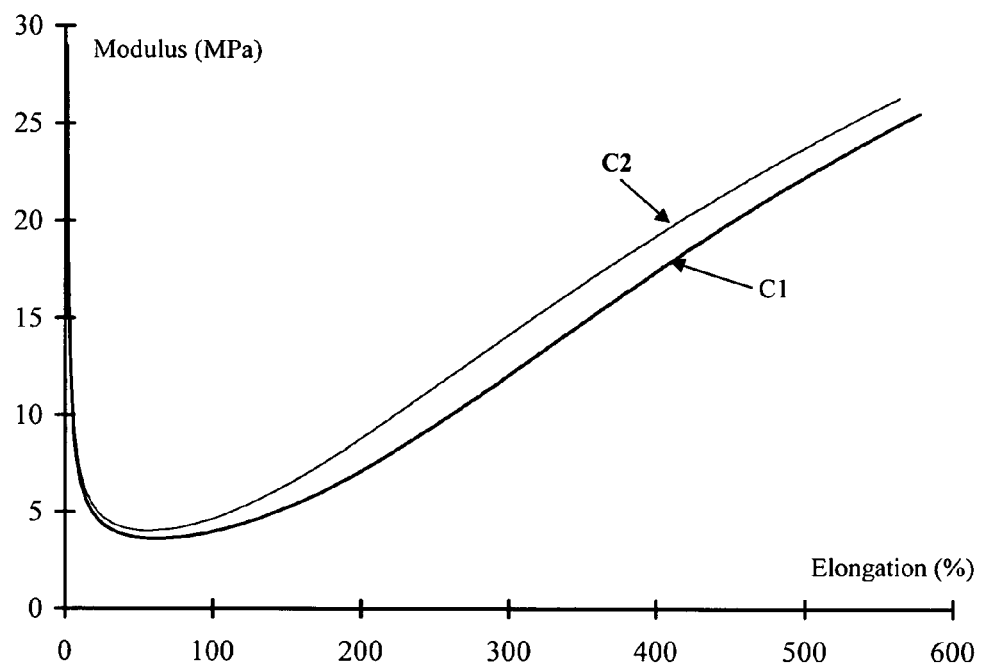

A) Determination of the Average Number x of Atoms of Sulfur

The average number x of atoms of sulfur, per alkoxysilane molecule, is calculated in accordance with the following formula.

$$x = \frac{(W_s - W_{Salt})/32}{(W_{Si}/2)/28}$$

with:
    $W_S$: percent by weight of total sulfur;
    $W_{Salt}$: percent by weight of residual elemental sulfur;
    $W_{Si}$: percent by weight of total silicon.

$W_S$ and $W_{Si}$ are determined by the technique of elemental analysis by X-ray fluorescence, whereas $W_{Salt}$ is determined by GPC (Gel Permeation Chromatography), as indicated hereafter.

The technique of elemental analysis by X-ray fluorescence is an overall method for assaying the total sulfur and the total silicon; it uses solubilisation of the sample in DMF (dimethyl formamide) and not mineralisation of the sample.

The apparatus used is an spectrofluorometer of trade name PHILIPS TW 2400, fitted with a rhodium tube.

DMSO (dimethylsulfoxide), solubilised in DMF, is used as standard for assaying the sulfur (range of S standardisation: from 0 to 3000 ppm). For assaying the silicon, D4 (octamethyltetrasiloxane) solubilised in DMF is used as standard (range of Si standardisation: from 0 to 3000 ppm). The sample is solubilised in DMF for measurement, in an amount of 0.5 g of sample per 40 g of DMF.

The percentage by weight of residual elemental sulfur ($W_{Sait}$) is assayed by GPC (Gel Permeation Chromatography):

analysis conditions: columns used: 3 mixed E PLgel columns with styrene divinylbenzene support, the columns being calibrated relative to polystyrene standards of 100 to 50,000 mass; detector: UV SHIMADZU SPD6A, observation wavelength=270 nm; eluent feed pump: WATERS pump; injector: VISP 717+; eluent: dichloromethane; flow rate: 1 ml/min; the internal standard of flow rate used is toluene (concentration of toluene in the eluent: 2/1000 weight/weight);

standardisation: injected volumes: 10 µl for the standard and 20–50 µl for the samples; range of concentrations used: for the standard of pure elemental sulfur used to plot the calibration curve, 10 to 30 mg of standard in 20 ml dichloromethane was used, and for the samples 200 mg of sample in 20 ml dichloromethane was used;

assay: the standard and the samples are solubilised in dichloromethane; standard solutions of sulfur are injected and a standardisation curve linking the surface of the peak detected and the concentration of elemental sulfur injected is plotted; under the same conditions, the samples are injected and the concentration of residual elemental sulfur is measured.

B) NMR Analyses

The analyses by $^{29}$Si-NMR, $^1$H-NMR and $^{13}$C-NMR are carried out under the following conditions:

1) $^{29}$Si-NMR a) Apparatus:

The one-dimensional silicon-29 NMR analyses are carried out with a Bruker AMX 300 spectrometer and a selective 10 mm $^{29}$Si probe operating at an observation frequency of the silicon at 59 MHz.

The chemical shifts (δ) are expressed in ppm, tetramethyl silane is used as external reference for the $^1$H and $^{29}$Si chemical shifts. The temperature is controlled by a unit of variable temperature (±0.1° K.). The NMR spectra are measured at a temperature of 300° K.

In order to obtain the proton-decoupled silicon-29 NMR spectra, an accumulation sequence with proton decoupling of "inverse gated" type (WALTZ 16) is used. The angle of the silicon-29 pulse is equal to 450 and the time between two silicon pulses is fixed at 4.5 sec. The free induction delay (FID) is obtained after 4096 accumulations. The spectral width is 10870 Hz and the number of points defining the free induction delay is equal to 32768.

b) Sample Preparation

For the samples which require the recording of one-dimensional silicon NMR spectra, approximately 2 ml of alkoxysilane compound is dissolved in 7 ml of a deuterated chloroform solution containing 2.5×10$^{-2}$ mol/l of Fe(acac)$_3$ (acac=acetylacetonate).

2) $^1$H-NMR and $^{13}$C-NMR

Apparatus:
sample preparation: 0.1 ml of sample in 0.5 ml of CDCl$_3$
spectrometer: Bruker AMX 300
probe: QNP 5 mm ($^1$H, $^{13}$C, $^{31}$P, $^{19}$F)
the NMR spectra are measured at a temperature of 300° K. (±0.1° K.).

$^1$H-NMR Analysis

A single acquisition sequence is used, at a pulse angle of 30°, and a time between pulses of 4.6 sec and 256 accumulations. The spectral width is 4500 Hz and no mathematical processing is effected. The observation frequency is 300 MHz.

$^{13}$C-NMR Analysis

An accumulation sequence with proton decoupling (WALZT 16) is used, with an pulse angle of 30°, and a time between pulses of 3 sec and 8192 accumulations. The spectral width is 20000 Hz and the signal is processed by an exponential function before the Fourier transform. The observation frequency is 75 MHz.

The deuterated solvent (CDCl$_3$) is used to compensate for any drift of the magnetic field and makes it possible to calibrate the spectra in chemical shift.

C) Determination of the Distribution of Polysulfides $S_x$

The molar distribution of the polysulfides $S_x$, for the alkoxysilane in question, is obtained from the $^{13}$C-NMR spectrum, utilising in known manner the characteristic peak areas of the CH$_2$ units linked to $S_2$, $S_3$, $S_4$ and $S_{\geq 5}$.

Expansion (or enlargement) of the $^{13}$C-NMR spectrum between 41.0 and 44.0 ppm is first of all effected; this spectrum comprises at most (case in which all the polysulfides $S_2$ to $S_{\geq 5}$ are present) three main peaks (resolved narrow peaks) followed by a complex block.

The three consecutive main peaks, corresponding respectively to $S_3$, $S_2$ and $S_4$ and located in practice in the spectral range of approximately 41.8 ppm to 42.6 ppm (typically, first narrow peak around 42 ppm; second narrow peak around 42.3 ppm; third narrow peak around 42.5 ppm) are integrated from valley to valley (I1, I2 and I3 are the values of the corresponding integrals, respectively), and also the complex block, which is located in practice between approximately 42.7 ppm and 43.7 ppm (for example from 42.85 to 43.5 ppm approximately), corresponding to $S_{\geq 5}$ (integral I4); then the distribution is calculated thus:

mole % $S_2=(I2\times100)/(I1+I2+I3+I4)$ mole % $S_3=(I1\times100)/(I1+I2+I3+I4)$ mole % $S_4=(I3\times100)/(I1+I2+I3+I4)$ mole % $S_{\geq 5}=(I4\times100)/(I1+I2+I3+I4)$.

It will be recalled here that, in known manner, NMR analysis does not distinguish heavy polysulfides $S_x$ with $x\geq 5$ ($S_5$, $S_6$, $S_7$, ... ); a single value is therefore accessible for the total of these polysulfides $S_{\geq 5}$.

I-2. Characterisation of the Rubber Compositions

The rubber compositions are characterised before and after curing, as indicated below.

A) Mooney Plasticity:

An oscillating consistometer such as described in French Standard NF T 43-005 (1991) is used. The Mooney plasticity is measured in accordance with the following principle: the uncured composition (i.e. before curing) is moulded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 Newton.meter).

B) Scorching Time:

The measurements are effected at 130° C., in accordance with French Standard NF T 43-005 (1991). The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

C) Rheometry:

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanization reaction. The measurements are processed in accordance with DIN Standard 53529—part 2 (March 1983): $t_i$ is the induction period, that is to say, the time necessary for the start of the vulcanization reaction; $t_\alpha$ (for example $t_{90}$ or $t_{99}$) is the time necessary to achieve a conversion of $\alpha\%$, that is to say $\alpha\%$ (for example 90 or 99%, respectively) of the deviation between the minimum and maximum torques. The conversion rate constant K (expressed in $\min^{-1}$) of order 1, calculated between 30% and 80% conversion, is also measured, which makes it possible to assess the vulcanization kinetics.

D) Tensile Tests:

These tests make it possible to determine the elasticity stresses and the properties at break. Unless indicated otherwise, they are effected in accordance with French Standard NF T 46-002 of September 1988. The nominal secant moduli (or apparent stresses, in MPa) at 10% elongation (ME10), 100% elongation (ME100) and 300% elongation (ME300) are measured in a second elongation (i.e. after an accommodation cycle). The breaking stresses (in MPa) and the elongations at break (in %) are also measured. All these tensile measurements are effected under normal conditions of temperature (23±2° C.) and humidity (50±5% relative humidity), in accordance with French Standard NF T 40-101 (December 1979).

Processing the tensile data recorded also makes it possible to plot the curve of the modulus as a function of the elongation (see attached FIGS. 1 and 2), the modulus used here being the true secant modulus measured in a first elongation, calculated reduced to the real cross-section of the test piece, and not to the initial section as previously for the nominal moduli.

E) "Bound Rubber" Test:

The so-called "bound rubber" test makes it possible to determine the proportion of elastomer, in a non-vulcanized composition, which is associated so intimately with the reinforcing filler that this proportion of elastomer is insoluble in the usual organic solvents. Knowledge of this insoluble proportion of rubber, linked with the reinforcing filler during mixing, gives a quantitative indication of the reinforcing activity of the filler in the rubber composition.

Such a method has been described, for example, in French Standard NF T 45-114 (June 1989) applied to the determination of the amount of elastomer bound to the carbon black.

This test, which is well-known to the person skilled in the art for characterising the quality of reinforcement provided by the reinforcing filler, has been described, for example, in the following documents: *Plastics, Rubber and Composites Processing and Applications*, Vol. 25, No. 7, p. 327 (1996); *Rubber Chemistry and Technology*, Vol. 69, p. 325 (1996).

In the present case, the amount of elastomer which cannot be extracted with toluene is measured, after swelling for 15 days of a sample of rubber composition (typically 300–350 mg) in this solvent (for example in 80–100 $cm^3$ of toluene), followed by a 24-hour drying step at 100° C., in a vacuum, before weighing the sample of rubber composition thus treated. Preferably, the above swelling step is carried out at ambient temperature (approximately 20° C.) and protected from light, and the solvent (toluene) is changed once, for example after the first five days' swelling.

The amount of "bound rubber" (% by weight), "BR", is calculated in known manner by the difference between the initial weight and the final weight of the sample of rubber composition, after making allowance for and eliminating from the calculation the fraction of the components which are insoluble by nature, other than the elastomer, which are initially present in the rubber composition.

F) Dynamic Properties:

The dynamic properties are measured on a viscoanalyser (Metravib VA4000), in accordance with ASTM Standard D 5992-96. The response of a sample of vulcanized composition (cylindrical test piece of a thickness of 4 mm and a section of 400 $mm^2$), subjected to an alternating single sinusoidal shearing stress, at a frequency of 10 Hz, at a temperature of 40° C. is recorded. Scanning is effected at an amplitude of deformation of 0.1 to 50% (outward cycle), then of 50% to 1% (return cycle); for the return cycle, the maximum value of the loss factor, $\tan(\delta)_{max}$, is recorded.

G) Hysteresis Losses:

The hysteresis losses (HL) are measured by rebound at 60° C. at the sixth impact, and are expressed in % in accordance with the following equation:

$$HL(\%)=100[(W_0-W_1)/W_0],$$

with $W_0$: energy supplied; $W_1$: energy restored.

H) Shore A Hardness:

The Shore A hardness of the compositions after curing is assessed in accordance with ASTM Standard D 2240-86.

I-3. Characterisation of the Tires or Treads

A) Rolling Resistance:

The rolling resistance is measured on a test drum, in accordance with method ISO 87-67 (1992). A value greater than that of the control, which is arbitrarily set to 100, indicates an improved result, that is to say a lesser rolling resistance.

B) Wear Resistance:

The tires are subjected to actual on-road travel on a given automobile, until the wear due to running reaches the wear indicators located in the grooves of the tread. A value greater than that of the control, arbitrarily set to 100, indicates an improved result, that is to say a greater mileage travelled.

C) Braking on Dry Ground:

The tires are mounted on an automobile fitted with an ABS braking system and the distance necessary to go from 100 km/h to 0 km/h upon sudden braking on dry ground (asphalt concrete) is measured. A value greater than that of the control, which is arbitrarily set to 100, indicates an improved result, that is to say a shorter braking distance.

D) Braking on Damp Ground:

The tires are mounted on an automobile fitted with an ABS braking system and the distance necessary to go from 50 km/h to 10 km/h upon sudden braking on wetted ground (asphalt concrete) is measured. A value greater than that of the control, which is arbitrarily set to 100, indicates an improved result, that is to say a shorter braking distance.

E) Grip on Damp Ground:

To assess the grip performance on damp ground, the behaviour of the tires mounted on a given automobile travelling round a circuit comprising numerous bends and wetted so as to keep the ground damp, under limit speed conditions is analysed.

On one hand, the minimum time necessary to cover the entire circuit is measured; a value greater than that of the control, which is arbitrarily set to 100, indicates an improved result, that is to say a shorter lap time.

The professional driver of the vehicle, on the other hand, assigns a subjective overall mark for road behaviour of the vehicle—and therefore of the tires—on this wetted circuit comprising bends; a mark greater than that of the control, which is arbitrarily set to 100, indicates improved overall behaviour.

F) Drift Thrust:

Each tire tested is mounted on a wheel of suitable dimension and inflated to 2.2 bar. It is made to run at a constant speed of 80 km/h on a suitable automatic machine (machine type "sol-plan" sold by MTS). The load "Z" is varied, at a drift angle of 1 degree, and the drift rigidity or thrust "D" (corrected for the thrust at zero drift) is measured in known manner, by recording the transverse force on the wheel as a function of this load Z using sensors. The drift thrust indicated in the tables is the gradient at the origin of the curve D(Z). An increase in drift thrust is favourable to the road behaviour on dry ground.

II. Conditions of Implementation of the Invention

The tires and treads of the invention incorporate rubber compositions based on at least each of the following constituents: (i) a (at least one) diene elastomer (component A defined hereafter), (ii) a (at least one) inorganic filler as reinforcing filler (component B defined hereafter), and (iii) a (at least one) specific alkoxysilane (component C defined hereafter) as (inorganic filler/diene elastomer) coupling agent.

Of course, the expression composition "based on" is to be understood to mean a composition comprising the mix and/or the product of reaction in situ of the various constituents used, some of these base constituents being liable to, or intended to, react together, at least in part, during the different phases of manufacture of the rubber compositions, tires or treads, in particular during the vulcanization thereof.

II-1. Diene Elastomer (Component A)

"Diene" elastomer or rubber is understood to mean, in known manner, an elastomer resulting at least in part (i.e. a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the tires, treads and compositions according to the invention:

(a) any homopolymer obtained by polymerisation of a conjugated diene monomer having 4 to 12 carbon atoms;
(b) any copolymer obtained by copolymerisation of one or more dienes conjugated together or with one or more vinyl aromatic compounds having 8 to 20 carbon atoms;
(c) a ternary copolymer obtained by copolymerisation of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
(d) a copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention, in particular when it applies to a tire tread, is used first and foremost with essentially unsaturated diene elastomers, in particular those of type (a) or (b) above.

Suitable conjugated dienes are, in particular, 1,3-butadiene, 2-methyl-1,3-butadiene, 2,3-di($C_1$–$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert, butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerisation conditions used, in particular of the presence or absence of a modifying and/or randomising agent and the quantities of modifying and/or randomising agent used. The elastomers may for example be block, statistical, sequential or microsequential elastomers, and may be prepared in dispersion or in solution; they may be coupled and/or starred or alternatively functionalised with a coupling and/or starring or functionalising agent.

Preferred are polybutadienes, and in particular those having a content of 1,2-units between 4% and 80%, or those having a content of cis-1,4 of more than 80%, polyisoprenes, butadiene-styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene-isoprene copolymers and in particular those having an isoprene content of between 5% and 90% by weight and a glass transition temperature (Tg, measured in accordance with ASTM Standard D3418-82) of from −40° C. to −80° C., isoprene-styrene copolymers and in particular those having a styrene content of between 5% and 50% by weight and a Tg of between −25° C. and −50° C. In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2- plus 3,4-units of the isoprene fraction of between 5% and 70%, and a content of trans-1,4 units of the isoprene fraction of between 10% and 50%, and more generally any butadiene-styrene-isoprene copolymer having a Tg of between −20° C. and −70° C.

In summary, particularly preferably, the diene elastomer is selected from the group of highly unsaturated diene elastomers which consists of polybutadienes ("BR"), polyisoprenes ("IR"), natural rubber ("NR"), butadiene copolymers, isoprene copolymers and mixtures of these elastomers. Such copolymers are more preferably selected from the group which consists of butadiene-styrene copolymers ("SBR"), butadiene-isoprene copolymers ("BIR"), isoprene-styrene copolymers ("SIR") and isoprene-butadiene-styrene copolymers ("SBIR").

The invention relates in particular to a tread for a tire, be it a new or a used tire (case of recapping).

In the case of a passenger-car tire, component A is for example an SBR, be it an SBR prepared in emulsion ("ESBR") or an SBR prepared in solution ("SSBR"), or an SBR/BR, SBR/NR (or SBR/IR), or alternatively BR/NR (or BR/IR), blend (mixture). In the case of an SBR elastomer, in particular an SBR having a styrene content of between 20% and 30% by weight, a content of vinyl bonds of the butadiene fraction of between 15% and 65%, a content of trans-1,4 bonds of between 15% and 75%, and a Tg of between −20° C. and −55° C. is used. Such an SBR copolymer, preferably an SSBR, is possibly used in a mixture with a polybutadiene (BR) having preferably more than 90% cis-1,4 bonds.

In the case of a tire for a heavy vehicle, component A is in particular an isoprene elastomer; "isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers or a mixture of these elastomers. Of the isoprene copolymers, mention will be made in particular of isobutene-isoprene copolymers (butyl rubber—IIR), isoprene-styrene copolymers (SIR), isoprene-butadiene copolymers (BIR) or isoprene-butadiene-styrene copolymers (SBIR). This isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used. For such a tire for a heavy vehicle, component A may also be constituted, in its entirety or in part, of another highly unsaturated elastomer such as, for example, an SBR elastomer.

According to another advantageous embodiment of the invention, in particular when it is applied to a tire sidewall, at least one essentially saturated diene elastomer is used, in particular at least one EPDM copolymer, whether this copolymer be used or not used, for example, in a mixture with one or more of the highly unsaturated diene elastomers mentioned above.

II-2. Reinforcing Filler (Component B)

The white or inorganic filler used as reinforcing filler may constitute all or only part of the total reinforcing filler, in this latter case associated, for example, with carbon black.

Preferably, the reinforcing inorganic filler constitutes the majority, that is to say, more than 50% by weight, of the total reinforcing filler, more preferably more than 80% by weight of this total reinforcing filler.

In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words which is capable of replacing a conventional tire-grade carbon black filler in its reinforcement function.

Preferably, the reinforcing inorganic filler is a mineral filler of the type silica ($SiO_2$) or alumina ($Al_2O_3$), or a mixture of these two fillers.

The silica used may be any reinforcing silica known to the person skilled in the art, in particular any precipitated or fumed silica having a BET surface area and a specific CTAB surface area both of which are less than 450 $m^2/g$, preferably from 30 to 400 $m^2/g$. Highly dispersible precipitated silicas (referred to as "HDS") are preferred, in particular when the invention is used for the manufacture of tires having a low rolling resistance; "highly dispersible silica" is understood in known manner to mean any silica having a substantial ability to disagglomerate and to disperse in an elastomeric matrix, which can be observed in known manner by electron or optical microscopy on thin sections. As non-limitative examples of such preferred highly dispersible silicas, mention may be made of the silica Perkasil KS 430 from Akzo, the silica BV3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped" silicas described in application EP-735 088.

The reinforcing alumina preferably used is a highly dispersible alumina having a BET surface area from 30 to 400 $m^2/g$, more preferably between 60 and 250 $m^2/g$, and an average particle size at most equal to 500 nm, more preferably at most equal to 200 nm, as described in the aforementioned application EP-A 810 258. Non-limitative examples of such reinforcing aluminas are in particular the aluminas A125, CR125, D65CR from Baïkowski.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible silicas and/or aluminas such as described above.

In the case of treads for tires, the reinforcing inorganic filler used, in particular if it is silica, preferably has a BET surface area of between 60 and 250 $m^2/g$.

One advantageous embodiment of the invention consists of using a reinforcing inorganic filler, in particular a silica, having a large BET specific surface area, within a range from 130 to 230 m$^2$/g, owing to the recognised high reinforcing ability of such fillers.

However, it has been noted, and this is another preferred embodiment of the invention, that the use of a reinforcing inorganic filler, in particular of a silica, having a BET specific surface area of less than 130 m$^2$/g, in such a case preferably of between 60 and 130 m$^2$/g, had the unexpected effect of reinforcing still further the primary technical effect of the invention, namely increasing the vulcanization kinetics of the rubber compositions in the presence of the specific alkoxysilane (component C) described hereafter.

The reinforcing inorganic filler may also be used in a blend (mixture) with carbon black.

Suitable carbon blacks are any carbon blacks, in particular the blacks of type HAF, ISAF and SAF, which are conventionally used in tires, and in particular in tire treads, such as the carbon blacks of series 100 to 300; as non-limitative examples of such blacks, mention may be made of the blacks N115, N134, N234, N330, N339, N347 and N375.

The quantity of carbon black present in the total reinforcing filler may vary within wide limits, this quantity of carbon black however preferably being less than the quantity of reinforcing inorganic filler present in the rubber composition.

In the tires and treads according to the invention, it is preferred to use, in a small proportion, a carbon black in association with the reinforcing inorganic filler, in a preferred amount of between 2 and 20 phr, more preferably within a range from 5 to 15 phr (parts by weight per hundred of elastomer). Within the ranges indicated, it was noted that there was a benefit to be had from the colouring properties (black pigmentation agent) and anti-UV properties of the carbon blacks, without furthermore adversely affecting the typical performance provided by the reinforcing inorganic filler, namely low hysteresis (reduced rolling resistance) and high adhesion on wet, snow-covered or icy ground.

Preferably, the amount of total reinforcing filler (reinforcing inorganic filler plus carbon black if applicable) is between 10 and 200 phr, more preferably between 20 and 150 phr, the optimum differing according to the intended applications; in fact, the level of reinforcement expected of a bicycle tire, for example, is in known manner distinctly lower than that required for a tire capable of travelling at a sustained high speed, for example a motorcycle tire, a passenger-car tire or a tire for a utility vehicle such as a heavy vehicle.

For treads for such tires which are capable of travelling at high speed, the quantity of reinforcing inorganic filler, in particular in the case of silica, is preferably between 30 and 40 phr, more preferably within a range from 50 to 120 phr.

According to one preferred embodiment of the invention, the reinforcing inorganic filler comprises between about 50% and up to 100% of silica.

In the present specification, the BET specific surface area is determined by adsorption of gas using the method of Brunauer-Emmett-Teller described in "*The Journal of the American Chemical Society*" Vol. 60, page 309, February 1938), more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17]. The CTAB specific surface area is the external surface area determined in accordance with French Standard NF T 45-007 of November 1987 (method B).

Finally, the person skilled in the art will understand that, as filler equivalent to the reinforcing inorganic filler described in the present section, there could be used a reinforcing organic filler, in particular a carbon black, covered at least in part with an inorganic layer, for example silica, which for its part requires the use of a coupling agent to provide the bond to the elastomer (see for example WO 96/37547, WO 97/42256, WO 98/42778, WO 99/28391).

II-3. Coupling Agent (Component C)

The alkoxysilane (component C) used in the rubber compositions, tires and treads according to the invention therefore corresponds to the aforementioned general formula (I):

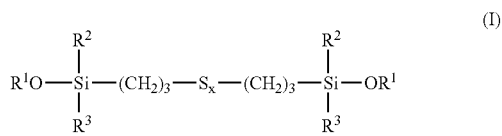

in which:
the symbols R$^1$, which may be identical or different, each represent a monovalent hydrocarbon group selected from among alkyls, whether straight-chain or branched, having from 1 to 4 carbon atoms, and alkoxyalkyls, whether straight-chain or branched, having from 2 to 8 carbon atoms;
the symbols R$^2$ and R$^3$, which may be identical or different, each represent a monovalent hydrocarbon group selected from among alkyls, whether straight-chain or branched, having from 1 to 6 carbon atoms, and the phenyl radical;
x is an integer or fraction of between 3 and 5.

It can clearly be seen that to provide the bond between the diene elastomer and the reinforcing inorganic filler, it comprises per molecule:
firstly, as "X" function, a tetrasulfide functional group (S$_x$) capable of forming a stable bond with the diene elastomer;
on the other hand, as "Y" function, one and only one alkoxyl group (—OR$^1$) per silicon atom—so-called alkoxysilyl function (≡Si—OR$^1$)—enabling it to be grafted on to the reinforcing inorganic filler by means of its surface hydroxyl groups;
the two propylene chains providing the bond between the tetrasulfide group at the centre of the molecule and the two alkoxysilyl functions fixed to each end of the molecule.

In formula (I) above, preferably the following characteristics are satisfied:
the symbols R$^1$ are selected from among methyl, ethyl, n-propyl, isopropyl, n-butyl, CH$_3$OCH$_2$—, CH$_3$OCH$_2$CH$_2$— and CH$_3$OCH(CH$_3$)CH$_2$—;
R$^2$ and R$^3$ are selected from among methyl, ethyl, n-propyl, isopropyl, n-butyl, n-hexyl and phenyl.

More preferably still, the following characteristics are satisfied:
the symbols R$^1$ are selected from among methyl, ethyl, n-propyl and isopropyl.
R$^2$ and R$^3$ are methyl groups.

By convention, in the present application, "tetrasulfide" is understood to mean the tetrasulfide S$_4$ proper and also any mixture of polysulfides S$_x$ (typically of S$_2$ to S$_8$), the average number of S atoms (referred to as x), per molecule of alkoxysilane, of which is between 3 and 5, preferably within a range from 3.5 to 4.5, this average value being measured using the method advocated in section I-1.A), with an accuracy (standard deviation) of the order of ±0.1.

In the present application, more precisely average x of between 3 and 5, preferably within a range from 3.5 to 4.5, should more precisely be understood to mean a value of average x of between 3±0.1 and 5±0.1, preferably within a range from 3.5±0.1 to 4.5±0.1.

For an average value x less than the minimum indicated (x=3), an overall deterioration of the properties was noted, in particular in terms of reinforcement (lower Shore hardness, moduli ME100, ME300 and ratio ME300/ME100), and hysteresis properties which had also deteriorated (higher values HL and $\tan(\delta)_{max}$), in other words less effective coupling furthermore associated with an adverse affect on the vulcanization kinetics (lower constant K).

For an average value x greater than the maximum indicated (x=5), there is in particular the risk of scorching and increasing difficulty in processing the compositions (excessive plasticity upon thermomechanical kneading), owing to excessive reactivity of the polysulfide group $S_x$.

For all the reasons indicated above, it is preferred to implement the invention with a tetrasulfide for which x lies within a range from 3.5 (±0.1) to 4.5 (±0.1), more preferably still from 3.8 (±0.1) to 4.2 (±0.1), that is to say, substantially equal to 4.

The tetrasulfurized monoalkoxysilanes of the formula (I) which are specially used within the scope of the present invention are those of specific formulae (II), (III) or (IV) hereafter:

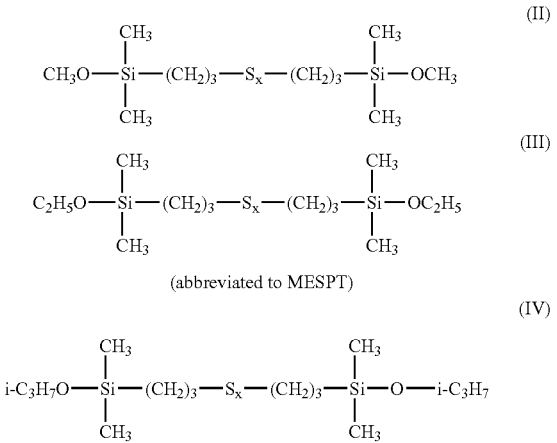

(abbreviated to MESPT)

in which the symbol x has the general definition (average x of between 3 and 5), and in particular the preferred definitions given above (namely average x lying within a range from 3.5 to 4.5, more preferably still within a range from 3.8 to 4.2).

The best known embodiment corresponds to the compound of formula (III) above. This is monoethoxydimethylsilylpropyl tetrasulfide (abbreviated to MESPT), of formula $[(C_2H_5O)(CH_3)_2Si(CH_2)_3S_2]_2$, the monoethoxylated homologue of the aforementioned TESPT.

In this formula III, x preferably lies within a range from 3.5 to 4.5, more preferably still within a range from 3.8 to 4.2.

The person skilled in the art will be able to adjust this content of component C according to the intended application, in particular the part of the tire which incorporates the rubber composition, the nature of the diene elastomer and the quantity of reinforcing inorganic filler used. Of course, in order to reduce the costs, it is desirable to use as little as possible thereof, that is to say just what is necessary for sufficient coupling between the diene elastomer and the reinforcing inorganic filler.

Its effectiveness makes it possible, in a large number of cases, to use component C in a preferred amount representing between 0.5% and 20% by weight relative to the quantity of reinforcing inorganic filler; amounts less than 15%, in particular less than 10%, are more particularly preferred.

So as to make allowance for the differences in specific surface area and density of the reinforcing inorganic fillers which may be used, as well as the molar masses of the coupling agents specifically used, it is preferable to determine the optimum amount of coupling agent (component C), in moles per meter squared of reinforcing inorganic filler, for each reinforcing inorganic filler used; this optimum amount is calculated from the weight ratio [coupling agent/reinforcing inorganic filler], the BET surface area of the filler and the molar mass of the coupling agent (referred to as M hereafter), according to the following known equation:

(moles/$m^2$ inorganic filler)=[coupling agent/inorganic filler](1/*BET*)(1/*M*)

Thus, preferably, the quantity of coupling agent used in the compositions according to the invention lies between $10^{-7}$ and $10^{-5}$ moles per $m^2$ of reinforcing white filler. More preferably still, the amount of coupling agent lies between $5\times10^{-7}$ and $5\times10^{-6}$ moles per $m^2$ of total inorganic filler.

Taking into account the quantities expressed above, generally, the content of component C is preferably greater than 1 phr, more preferably between 2 and 20 phr. Below the minimum amounts indicated, the effect risks being inadequate, whereas beyond the maximum amount advocated generally no further improvement is observed, while the costs of the composition increase; for these various reasons, this content of component C is more preferably still between 2 and 10 phr.

The person skilled in the art will furthermore understand that this component C could be grafted on to the reinforcing inorganic filler beforehand (via its alkoxysilyl, in particular ethoxysilyl, function), the inorganic filler thus "precoupled" then being able to be bonded to the diene elastomer by means of the free tetrasulfide function.

The components C previously described, which bear a single alkoxysilyl function, in particular ethoxysilyl, have proved particularly effective on their own, in particular for the primary problem solved which relates to the vulcanization kinetics; they may advantageously constitute the sole coupling agent present in the elastomeric compositions used according to the invention.

II-4. Synthesis of the Coupling Agent (Component C)

The tetrasulfides previously described (formulae I to IV) may be prepared according to various synthesis processes, which are for the most part known except for the starting reagents, including the preferred methods A, B, C and D described hereafter.

A) Method A:

The compounds of formula (I), in particular (II), (III) or (IV), may be obtained by direct reaction of a halogenated monoalkoxysilane of formula (V) with an anhydrous metallic polysulfide of formula (VI), operating at a temperature of from −20° C. to 90° C., in the presence possibly of an inert polar (or non-polar) organic solvent, by applying the following synthesis equation:

equation 1

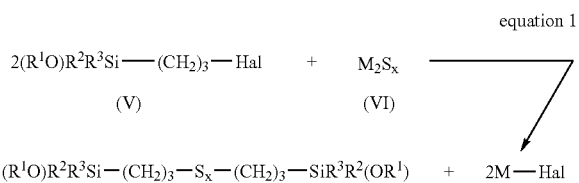

wherein:
- the symbols $R^1$, $R^2$, $R^3$ and x are as defined above;
- the symbol Hal represents a halogen atom selected from among chlorine, bromine and iodine atoms, preferably a chlorine atom;
- the symbol M represents an alkali metal or alkaline-earth metal, preferably an alkali metal selected from among lithium, sodium and potassium.

As far as the detailed practical manner of implementing the synthesis above is concerned, reference may be made for example to the contents of EP-A-848 006, which illustrates, starting from other reagents, operating methods applicable to the performance of this method A.

The halogenated silanes of formula (V) are commercial products or products which can be easily prepared from commercial products. The metallic polysulfides of formula (VI) may be prepared, for example, by reacting an alkaline sulfide $M_2S$, containing water of crystallisation, with elemental sulfur at a temperature of from 60° C. to 300° C., in a vacuum and in the absence of an organic solvent.

B) Method B:

The compounds of formulae (I) to (IV) may also be obtained by implementing the following steps (a) and (b):
(a) $H_2S$ is placed in contact with a metal alkoxide of formula (VII), used in the form of a solution, operating at a temperature of from 25° C. to 60° C., possibly in the presence of an inert polar (or non-polar) organic solvent, by applying the following synthesis equation:

equation 2

in which M' represents an alkali metal, preferably lithium, sodium or potassium, and R represents an alkyl, whether straight-chain or branched, having from 1 to 4 carbon atoms, preferably ethyl; then (b) a mixture based on elemental sulfur and halogenated monoalkoxysilane of formula (V) defined above in method A is reacted with the reaction product of step (a), operating at a temperature of from 25° C. to the reflux temperature of the reaction medium.

As far as the practical manner of implementing the aforementioned steps (a) and (b) is concerned, reference may be made to the contents of U.S. Pat. No. 5,489,701 for more details, which illustrates, starting from other reagents, operating methods applicable to the performance of this method B.

C) Method C:

The compounds of formulae (I) to (IV) may also be obtained by implementing the steps (c) and (d) hereafter:
(c) ammonia $NH_3$ or an amine is placed in contact with $H_2S$ and elemental sulfur, at an ambient temperature of the order of 25° C.; then
(d) the halogenated silane of formula (V) defined above in method A is reacted with the reaction product of step (c), operating under autogenous pressure at a temperature of from 0° C. to 175° C., possibly in the presence of an inert polar (or non-polar) organic solvent, by applying the following synthesis equation:

equation 3

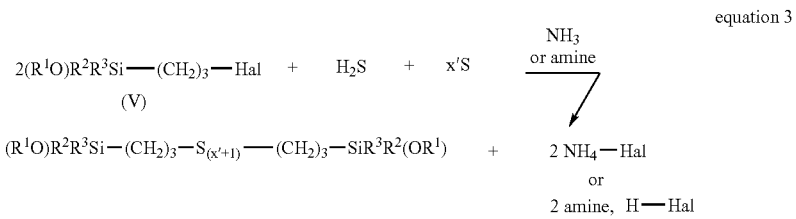

in which the various symbols $R^1$, $R^2$, $R^3$ and Hal are as defined above in method A; x' is an integer or fraction, of between 2 and 4, and preferably within a range from 2.5 to 3.5.

For the detailed practical manner of implementing steps (c) and (d) above, reference may be made to the contents of U.S. Pat. No. 4,125,552, which illustrates, starting from other reagents, operating methods applicable to the performance of this method C.

It should be noted that, during the carrying-out of the aforementioned step (c), there forms in situ the compound of formula (VIII) $(NH_4)_2S_{(x'+1)}$ or (IX) $(amine)_2S_{(x'+1)}$ which is in fact the active ingredient which will give rise, by reaction with the halogenated silane of formula (V), to the polysulfurized monoalkoxysilane of formula (I).

D) Method D:

The compounds of formula (I), in particular (II), (III) or (IV), may also be obtained, and this is a preferred synthesis method, by implementing steps (e) and (f) defined hereafter:
(e) a metal alkoxide of formula (VII) defined above in method B, used in the form of a solution, is placed in contact, at a temperature of from 25° C. to 80° C., possibly in the presence of an inert polar (or non-polar) organic solvent, with firstly elemental sulfur and secondly $H_2S$; then
(f) the halogenated silane of formula (V) defined above in method A is reacted with the reaction product of step (e), operating at a temperature of from 40° C. to 100° C., possibly under autogenous pressure, possibly in the presence of an inert polar (or non-polar) organic solvent;

by applying the following synthesis equation:

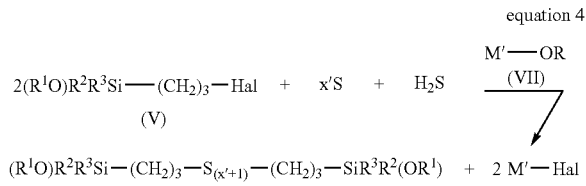

equation 4

$$2(R^1O)R^2R^3Si-(CH_2)_3-Hal + x'S + H_2S \xrightarrow{M'-OR \text{ (VII)}}$$
(V)

$$(R^1O)R^2R^3Si-(CH_2)_3-S_{(x'+1)}-(CH_2)_3-SiR^3R^2(OR^1) + 2\,M'-Hal$$

in which the various symbols $R^1$, $R^2$, $R^3$, Hal, x', M' and R are as defined above for methods A, B and C.

As far as the practical manner of implementing the aforementioned steps (e) and (f) is concerned, reference may be made to the contents of U.S. Pat. No. 4,125,552 for more details, which illustrates, starting from other reagents and using an aminated base instead of a metal alkoxide base, operating methods applicable to the performance of this method D.

It should be noted that, during the carrying-out of the aforementioned step (e), there forms in situ the compound of formula (X) $M'_2S_{(x'+1)}$ which is in fact the active substance which will give rise, by reaction with the halogenated silane of formula (V), to the polysulfurized monoalkoxysilane of formula (I).

Preferably, the aforementioned step (e) is carried out by preparing the mixture (metal alkoxide+sulfur+$H_2S$) at a temperature of from 20° C. to 25° C., then by heating the mixture at a temperature of from 50° C. to 80° C. for a time of from 30 minutes to 2 hours, so as to finish off the formation of the compound of formula (X); then, the reaction medium is cooled down to a temperature of from 15° C. to 25° C. before commencing the operating method of step (f).

With regard to the quantities of reagents, there should be at least two moles of halogenated silane (V) per mole of $H_2S$ and at least two moles of S per mole of $H_2S$. The number of atoms of elemental sulfur $S_{(x'+1)}$ in the polysulfide group is a function of the molar ratio of the S relative to $H_2S$. For example, using three moles of S (x'=3) per mole of $H_2S$ gives the tetrasulfide (x'+1=4).

The person skilled in the art will readily understand that the tetrasulfturized alkoxysilanes synthesised in accordance with methods A to D previously described are in fact mixtures of polysulfides (typically $S_2$ to $S_8$), with consequently an average value of the x's which is generally different from the entire value 4. However, the only one which is in accordance with the invention is the use of alkoxysilanes of formula (I), in particular of MESPT of formula (III), the average x of which is between 3 (±0.1) and 5 (±0.1), preferably within a range from 3.5 (±0.1) to 4.5 (±0.1).

As far as the distribution of polysulfides $S_x$ of the tetrasulfurized alkoxysilanes above is concerned, which is accessible by the NMR analysis described in section I-1.C), the molar ratio of ($S_3+S_4$) is preferably greater than 40% (namely an amount of $S_2+S_{x\geq 5}$ less than 60%), more preferably greater than 50% (namely an amount of $S_2+S_{x\geq 5}$ less than 50%), that is to say that in this latter case the polysulfides $S_3$ and $S_4$ represent the majority of the polysulfides $S_x$ (in mole %). Furthermore, the molar ratio of $S_2$ is preferably less than 30%, more preferably less than 20%. All these limit values are given to within the accuracy of NMR measurement, with an absolute error of approximately ±1.5 (for example 20±1.5% for the last amount indicated).

II-5. Various Additives

Of course, according to the invention, the elastomeric compositions also comprise all or part of the conventional additives for diene rubber compositions intended for the manufacture of tires or treads for tires, such as, for example extender oils, plasticisers, protective agents such as antiozone waxes, chemical antiozonants, antioxidants, antifatigue agents, adhesion promoters, coupling activators such as described for example in applications WO 00/05300 and WO 00/05301 mentioned above, reinforcing resins such as described in WO 02/10269, a cross-linking system based on either sulfur, or on sulfur and/or peroxide and/or bismaleimide donors, vulcanization accelerators, vulcanization activators, etc. There may also be associated with the reinforcing inorganic filler, if necessary, a conventional poorly reinforcing or non-reinforcing white filler, such as particles of clay, bentonite, talc, chalk, kaolin, etc.

The elastomeric compositions may also contain, in addition to the coupling agents (components C) previously described, agents for covering the reinforcing inorganic filler, comprising for example the single Y function, or more generally processing aids liable, in known manner, owing to an improvement in the dispersion of the inorganic filler in the rubber matrix and to a reduction in the viscosity of the compositions, to improve their ability to be worked in the uncured state, these agents, being, for example, alkylalkoxysilanes, in particular alkyltriethoxysilanes, such as for example 1-octyl-triethoxysilane sold by Degussa-Hüls under the name Dynasylan Octeo, or 1-hexa-decyl-triethoxysilane sold by Degussa-Hüls under the name Si216, polyols, polyethers (for example polyethylene glycols), primary, secondary or tertiary amines (for example trialkanolamines), hydroxylated or hydrolysable polyorganosiloxanes, for example α,ω-dihydroxy-polyorganosiloxanes (in particular α,ω-dihydroxy-polydimethylsiloxanes).

II-6. Preparation of the Rubber Compositions, Treads and Tires

The compositions are produced in suitable mixers, using two successive preparation phases well-known to the person skilled in the art: a first phase of thermomechanical working or kneading (sometimes referred to as "non-productive" phase) at high temperature, up to a maximum temperature ($T_{max}$) of between 110° C. and 190° C., preferably between 130° C. and 180° C., followed by a second phase of mechanical working (sometimes referred to as "productive" phase) at lower temperature, typically less than 110° C., for example between 40° C. and 100° C., during which finishing phase the cross-linking or vulcanization system is incorporated; such phases have been described for example in the aforementioned applications EP-A-501 227, EP-A-735 088, EP-A-810 258, WO 00/05300, WO 00/05301 or WO 02/10269.

The process for manufacturing the compositions according to the invention is characterised in that at least the reinforcing inorganic filler (component B) and the coupling agent (component C) are incorporated by kneading into the diene elastomer (component A) during the first, so-called non-productive, phase, that is to say that at least these different base constituents are introduced into the mixer and are kneaded thermomechanically, in one or more steps, until a maximum temperature of between 110° C. and 190° C., preferably between 130° C. and 180° C., is reached.

By way of example, the first (non-productive) phase is effected in a single thermomechanical step during which in a first phase all the base constituents necessary (components A, B and C), then in a second phase, for example after one to two minutes' kneading, any complementary covering agents or processing agents and other various additives, with the exception of the vulcanization system are introduced into a suitable mixer, such as a conventional internal mixer,; when the apparent density of the reinforcing inorganic filler is low (generally the case of silicas), it may be advantageous to divide the introduction thereof into two or more parts. A second step of thermomechanical working may be added in this internal mixer, after the mixture has dropped and after intermediate cooling (cooling temperature preferably less than 100° C.), with the aim of making the compositions undergo complementary thermomechanical treatment, in particular in order to improve further the dispersion, in the elastomeric matrix, of the reinforcing inorganic filler and its coupling agent. The total duration of the kneading, in this non-productive phase, is preferably between 2 and 10 minutes.

After cooling of the mixture thus obtained, the vulcanization system is then incorporated at low temperature, generally in an external mixer such as an open mill; the entire mixture is then mixed (productive phase) for several minutes, for example between 5 and 15 minutes.

The final composition thus obtained is then calendered, for example in the form of thin slabs (thickness of 2 to 3 mm) or thin sheets of rubber in order to measure its physical or mechanical properties, in particular for laboratory characterisation, or alternatively extruded to form rubber profiled elements used directly, after cutting or assembling to the desired dimensions, as a semi-finished product for tires, in particular as treads, plies of crown reinforcements, sidewalls, plies of radial carcass reinforcements, beads or protectors.

In summary, the process according to the invention, for preparing a sulfur-vulcanizable elastomeric composition based on a reinforcing inorganic filler and intended for the manufacture of tires or treads for tires, said composition having accelerated vulcanization kinetics, comprises the following steps:

incorporating in a diene elastomer, in a mixer:
  a reinforcing inorganic filler;
  a bis-alkoxysilane tetrasulfide as (inorganic filler/diene elastomer) coupling agent,
  thermomechanically kneading the entire mixture, in one or more stages, until a maximum temperature of between 110° C. and 190° C. is reached;
cooling the entire mixture to a temperature of less than 100° C.;
then incorporating a vulcanization system;
kneading the entire mixture until a maximum temperature less than 110° C. is reached, and it is characterised in that said bis-alkoxysilane tetrasulfide satisfies the aforementioned formula (I).

The process according to the invention, for preparing a tire or a tire tread with accelerated vulcanization kinetics, incorporating the elastomeric composition obtained by the process above, therefore comprises as an additional step the one consisting of calendering or extruding this composition in the form of a tire tread or of a rubber profiled element incorporated as semi-finished product in the desired tire.

The vulcanization (or curing) of the tire or tread is carried out in known manner at a temperature of preferably between 130° C. and 200° C., under pressure, for a sufficient time which may vary for example between 5 and 90 min as a function in particular of the curing temperature, the vulcanization system adopted and the vulcanization kinetics of the composition in question.

The cross-linking system proper is preferably based on sulfur and a primary vulcanization accelerator, in particular an accelerator of the sulfenamide type. To this vulcanization system there are added, incorporated during the first non-productive phase and/or during the productive phase, various known secondary accelerators or vulcanization activators such as zinc oxide, stearic acid, guanidine derivatives (in particular diphenylguanidine), etc. The sulfur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr in particular when the invention applies to a tire tread.

It goes without saying that the invention relates to the compositions, tires and treads previously described, both in the "uncured" state (i.e. before curing) and in the "cured" or vulcanized state (i.e. after cross-linking or vulcanization).

III. EXAMPLES OF EMBODIMENT OF THE INVENTION

III-1. Synthesis of the Coupling Agent

A) Synthesis of the MESPT: $[(C_2H_5O)(CH_3)_2Si(CH_2)_3S_2]_2$

This example describes the preparation of the bis-monoethoxydimethylsilylpropyl tetrasulfide (abbreviated to MESPT) of formula (III), implementing the synthesis method D described previously.

91.9 g of sodium ethanolate (1.352 mole, or the equivalent of 2 moles per 1 mole of $H_2S$) in solution at 21 mass % in ethanol (438 g) and 250 ml of toluene are introduced in a current of argon into the bottom of a 3-litre double-casing glass reactor which is fitted with a condenser, a mechanical stirring means (Rushton turbine), a thermocouple, a gas feed pipe (argon or $H_2S$) and an intake for the peristaltic pump.

The whole is stirred (200–300 rpm). A weight of 65 g of sulfur (2.031 moles, or the equivalent of 3 moles per one mole of $H_2S$) is then added. After purging the circuits with argon, the $H_2S$ (23 g, or 0.676 mole) is introduced by bubbling by means of a dip tube, namely for 45 to 60 minutes. The solution changes from an orange coloration with yellow-orange particles to a dark brown coloration without particles.

Under a current of argon, the mixture is heated to 60° C. for 1 hour so as to complete the conversion into anhydrous $Na_2S_4$. The reaction medium changes from a dark brown to a red-brown colour with brown particles. The reaction medium is then cooled using a refrigeration means (at 10–15° C.) to reach a temperature close to 20° C.

A weight of 244 g γ-chloropropylethoxydimethylsilane (1.352 moles, or the equivalent of 2 moles per mole of $H_2S$) is added by means of a peristaltic pump (10 ml/min) over 30 minutes. The reaction medium is then heated to 75±2° C. for 4 hours. During the test, the NaCl precipitates. At the end of the 4 hours' heating, the medium is cooled to ambient temperature (20–25° C.). It adopts an orange colour with yellow particles.

After decanting of the reaction medium, it is filtered over cellulose card under nitrogen pressure in a stainless steel filter. The cake is washed with 2 times 100 ml of toluene.

The red-brown filtrate is evaporated in a vacuum (maximum pressure=3–4×10² Pa–maximum temperature=70° C.).

A weight of 280 g of bis-monoethoxydimethylsilylpropyl tetrasulfide (0.669 mole) is then obtained in the form of a yellow-orange oil.

Monitoring by ¹H-NMR, ²⁹Si-NMR and ¹³C-NMR makes it possible to check that the structure obtained is indeed in accordance with the tetrasulfide of formula (III), namely (for x=4):

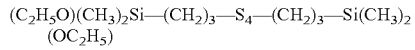
(OC₂H₅)

²⁹Si-NMR: 16.3 ppm (s, Me₂(OEt)Si,)

¹H-NMR: 0.0 to 0.1 ppm (several s, Si(CH₃)₂, 12H), 0.66 ppm (m, SiCH₂, 4H), 1.13 ppm (t, CH₃CH₂O, 6H), 1.75 ppm (m, SiCH₂CH₂, 4H), 2.64 ppm (t, CH₂S₂), 2.8 to 3.0 ppm (several t, CH₂S$_{x \geq 3}$), 3.61 ppm (q, CH₂O, 4H).

¹³C-NMR: −1.95 to −2.2 ppm (several CH₃Si), 15.4 to 15.6 ppm (several CH₂Si), 18.5 ppm (CH₃CH₂), 22.5 to 23.5 ppm (several SiCH₂CH₂), 42.36 ppm (CH₂S₂), 42.08 ppm (CH₂S₃), 42.59 ppm (CH₂S₄), 42.85 to 43.5 ppm (CH₂S$_{x \geq 5}$), 58.2 ppm (OCH₂CH₃).

The average number x of sulfur atoms per molecule of MESPT, calculated using the method advocated in section I-1.A), is equal to 3.9 (standard deviation: ±0.1), therefore practically equal to 4, with W$_S$=30.1%; W$_{Salt}$=0.75% and W$_{Si}$=13.1%.

The distribution of the polysulfides S$_x$, which is accessible by the NMR analysis described in section I-1.C), is as follows (in mole %): S₂=16±1.5; S₃=28±1.5; S₄=27±1.5 and S$_{x \geq 5}$=29±1.5.

It will therefore be noted that, in accordance with a preferred embodiment of the invention, the molar ratio of (S₃+S₄) is greater than 50%, the polysulfides S₃ and S₄ thus representing the majority of the polysulfides S$_x$. Furthermore, the amount of S₂ is advantageously less than 20%.

It will be understood that modified synthesis conditions would make it possible to obtain other distributions of polysulfides, with average values of x which are variable but always between 3 (±0.1) and 5 (±0.1), preferably within a range from 3.5 (±0.1) to 4.5 (±0.1).

B) Synthesis of the MESPD: [(C₂H₅O)(CH₃)₂Si(CH₂)₃S]₂

This example describes the preparation of bis-monoethoxydimethylsilylpropyl disulfide (abbreviated to MESPD), also using the above synthesis method D.

284.2 g of sodium ethanolate (4.18 mole, or the equivalent of 2 moles per one mole of H₂S) in solution at 21 mass % in ethanol (1353.3 g) are introduced in a current of argon into the bottom of a 5-litre double-casing glass reactor which is fitted with a condenser, a mechanical stirring means (Rushton turbine), a thermocouple, a gas feed pipe (argon or H₂S) and an intake for the peristaltic pump.

The whole is stirred (200–300 rpm). A weight of 66.87 g of sulfur (2.09 moles, or the equivalent of 1 mole per mole of H₂S) is then added. After purging the circuits with argon, the H₂S (71.0 g, or 2.09 moles) is introduced by bubbling by means of a dip tube, namely for 45 to 60 minutes. The solution becomes homogenous and adopts a chestnut-brown colour without particles.

Under a current of argon, the mixture is heated to 60° C. for 1 hour so as to complete the conversion into anhydrous Na₂S₂. A yellow precipitate appears. The reaction medium is then cooled using a refrigeration means (at 10–15° C.) to reach a temperature close to 20° C.

A weight of 754.4 g γ-chloropropylethoxydimethylsilane (4.18 moles, or the equivalent of 2 moles per one mole of H₂S) is added by means of a peristaltic pump (10 ml/min) over 30 minutes. The reaction medium is then heated to 70° C. for 4 hours. During the test, the NaCl precipitates. At the end of the 4 hours' heating, the medium is cooled to ambient temperature (20–25° C.). It adopts a green colour with yellow particles.

After decanting, the reaction medium is filtered through cellulose card under nitrogen pressure in a stainless steel filter. The orange filtrate is evaporated in a vacuum (maximum pressure=5×10² Pa–maximum temperature=40° C.). A weight of 739.74 g of bis-monoethoxydimethylsilylpropyl disulfide (2.089 mole) is then obtained in the form of a khaki-coloured oil.

Monitoring by ¹H-NMR, ²⁹Si-NMR and ¹³C-NMR makes it possible to check that the structure obtained is indeed in accordance with the formula of MESPT, namely (with y equal to approximately 2):

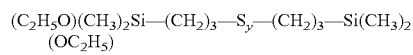
(OC₂H₅)

²⁹Si-NMR: 16.5 ppm (s, Me₂(OEt)Si,)

¹H-NMR: 0.03 ppm (s, Si(CH₃)₂, 12H), 0.61 ppm (m, SiCH₂, 4H), 1.11 ppm (t, CH₃CH₂O, 6H), 1.65 ppm (m, SiCH₂CH₂, 4H), 2.62 ppm (t, CH₂S₂), 2.80 ppm (t, CH₂S₃), 3.58 ppm (q, CH₂O, 4H).

¹³C-NMR: −1.8 to −2.5 ppm (several CH₃Si), 15.1 ppm (CH₂Si), 18.5 ppm (CH₃CH₂O), 22.8 to 23.2 ppm (several SiCH₂CH₂), 42.4 ppm (CH₂S₂), 42.1 ppm (CH₂S₃), 58.2 ppm (OCH₂CH₃).

The average number (y) of sulfur atoms per molecule of MESPD, calculated using the method advocated in section I-1.A), is practically equal to 2 (precisely y=1.9±0.1; W$_S$=15.7%; W$_{Salt}$=0% and W$_{Si}$=14.4%). As far as the molar distribution of the polysulfides of the MESPD is concerned, the following values are found (¹³C-NMR): S₂=94% and S₃=6% (only the first two peaks corresponding to S₂ and S₃ are visible).

III-2. Preparation of the Tire Treads

For the following tests, the procedure is as follows: the diene elastomer (or the mixture of diene elastomers, if applicable), the reinforcing filler, the coupling agent, then, after one to two minutes' kneading, the various other ingredients, with the exception of the vulcanization system, are introduced into an internal mixer filled to 70%, the initial tank temperature of which is approximately 60° C. Thermomechanical working (non-productive phase) is then performed in one or two steps (total duration of kneading equal for example to about 7 minutes), until a maximum "dropping" temperature of about 160–165° C. is reached. The mixture thus obtained is recovered, it is cooled and then the vulcanization system (sulfur and sulfenamide primary accelerator) are added on an external mixer (homo-finisher) at 30° C., by mixing everything (productive phase) for example for 3 to 10 minutes.

The compositions thus obtained are then either calendered in the form of plates (thickness of 2 to 3 mm) in order to measure their physical or mechanical properties, or extruded directly in the form of treads for tires.

III-3. Characterisation Tests

A) Test 1

The object of this test is to demonstrate the improved performances of an elastomeric composition based on MESPT, compared with a control composition using TESPT.

For this two compositions based on diene elastomers (blend of SSBR and BR) reinforced with silica are prepared, referred to as C-1 and C-2. The two compositions are prepared in a mixer of sufficient size to permit the manufacture of treads and actual running tests for tires comprising these treads.

The two compositions are identical, with the exception of the coupling agent used:
composition C-1: TESPT (control);
composition C-2: MESPT (synthesised in accordance with section III-1.A).

The two tetrasulfurized alkoxysilanes are used in a substantially isomolar amount of silicon (base x=4), that is to say that, whatever the composition tested, the same number of moles of "Y" functions ($Si\equiv(OEt)_a$; with "a" equal to 1 or 3) which are reactive with respect to the silica and its hydroxyl surface groups is used. The two alkoxysilanes are used in an amount less than 8 phr, this quantity representing less than 10% by weight relative to the quantity of reinforcing inorganic filler. The amount of coupling agent in composition C-2 represents approximately $9\times10^{-7}$ moles per meter squared of inorganic filler (silica).

It will be recalled that TESPT, the control of choice since it constitutes the reference coupling agent for "Green Tires" (low rolling resistance), has the developed formula (x close to 4):

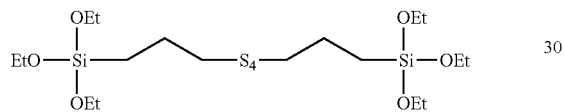

In this test the TESPT sold by Degussa under the name "Si69" (average x equal to 3.75 according to the supplier's data sheet) is used.

The structure above is therefore very close to that of the MESPT of formula (III):

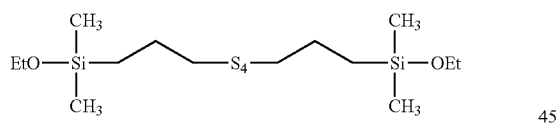

the latter differing therefrom only in the presence of a single ethoxyl group (and two methyl groups) instead of the usual three ethoxyl groups.

In other words, compared with the control composition, three times fewer ethoxyl groups are used in the composition according to the invention.

Tables 1 and 2 show the formulation of the two compositions (Table 1—amounts of the different products expressed in phr), and their properties before and after curing (30 min at 150° C.); the vulcanization system is formed of sulfur and sulfenamide.

The attached FIG. 1 shows the curves of modulus (in MPa) as a function of the elongation (in %); these curves are marked C1 and C2, and correspond to compositions C-1 and C-2 respectively.

Examination of the different results of Table 2 leads to the following observations:
although the values of Mooney plasticity do remain relatively low in both cases, a better result is however noted (viscosity lowered by 8%) on the composition according to the invention C-2, which is an indicator of an improved processing ability in the uncured state;

composition C-2 furthermore exhibits slightly superior resistance to scorching (T5 increased by 3 min), the time T5 furthermore remaining sufficiently short (less than 25 min) to meet industrial requirements appropriate for the manufacture of compositions for tires or tire treads;

the values BR ("Bound rubber") are also superior (by approximately 7%) to those of the control, which illustrates quality coupling;

the latter observation is confirmed after curing: composition C-2, compared with the control C-1, has values of Shore hardness on one hand, and of moduli at high deformation (ME100, ME300) and of ratio (M300/M100) on the other hand, which are distinctly superior, all clear indicators to the person skilled in the art of improved reinforcement;

FIG. 1 confirms the preceding observations: curve C2 located above curve C1, in particular for the high elongations (100% and more), which represents a high level of reinforcement and therefore, a priori, an excellent ability to resist wear for a tread incorporating the composition according to the invention;

the composition C-2 is furthermore distinguished by very substantially improved hysteresis properties, as illustrated by a significantly lower value (10–15% less) of the losses HL and of $\tan(\delta)_{max}$, which already indicates a reduced rolling resistance for a tread formed of the composition according to the invention.

Finally, if the results recorded above already constitute an unexpected result in terms of processing in the uncured state, of reinforcement and hysteresis, all characteristics which are improved compared with the TESPT control, rheometric properties which are very substantially modified compared with the control are furthermore noted:

conversion rate constant K more than twice as great (multiplied by 2.17) in the case of MESPT (0.446 $min^{-1}$ instead of 0.206 $min^{-1}$), which is advantageously close to the K values which are usual for conventional compositions filled with carbon black, with an "equivalent" rubber formulation, that is to say, one which is typical of a passenger-car tire tread;

longer induction time $t_i$ (10 min instead of 6 min) and maximum torque achieved in a distinctly shorter time (see $t_{90}$ or $t_{99}$), the total vulcanization time ($t_{99}-t_i$) being reduced by half compared with the control.

In other words, advantageously, the curing of the composition according to the invention may be effected in a distinctly shorter time, without adversely affecting, and on the contrary here favouring, the step of initial processing owing to reduced plasticity, a longer induction time and an increased resistance to scorching (T5).

Such a difference in response between the MESPT and the reference TESPT justifies these initial results now facing actual tread running tests, as set forth in Test 2 below.

B) Test 2

The compositions C-1 and C-2 previously described are used in this test as treads for passenger-car tires having a radial carcass, of dimension 175/70 R14 (speed rating T), which are conventionally manufactured and identical in all points except for the rubber composition constituting the tread: composition C-1 for the control tires (P-1) and composition C-2 for the tires of the invention (P-2).

The running results obtained are summarised in Table 3.

It will be noted first of all that the rolling resistance of the tires P-2 according to the invention is significantly reduced, by approximately 4% compared with the control "Green Tires" P-1, which is equivalent to an additional saving in fuel consumption for a passenger vehicle fitted with tires according to the invention.

The tires thus prepared are furthermore subjected to on-road travel on a passenger car of the marque Citroën Xsara, in order to determine the wear resistance. In a manner known to the person skilled in the art, the wear resistance of the rubber composition, during the travel of the tire, is directly correlated to the level of reinforcement provided by the reinforcing filler and its associated coupling agent, that is to say to the quality of (filler/elastomer) coupling obtained. In other words, the measurement of the wear resistance is an excellent indicator, if not the best, since it is evaluated on the final manufactured product, of the performance of the coupling agent used.

It will be noted after travel that the tire according to the invention exhibits a wear resistance performance at least identical if not slightly superior (improvement of approximately 2% noted) to that of the control tire.

Thus, on the treads of the invention, the compromise of rolling resistance and wear resistance is improved compared with the reference formed by the treads of the control tires P-1, as the rubber properties results of Test 1 above led one to predict, while benefiting for these treads (and therefore for the tires which are fitted therewith) from a distinctly improved curing ability.

C) Test 3

This test demonstrates the superiority of the MESPT compared with two other known polysulfurized (disulfurized) alkoxysilanes, in this case triethoxysilylpropyl disulfide (abbreviated to TESPD) and monoethoxydimethylsilylpropyl disulfide (abbreviated to MESPD).

The first disulfide (TESPD), of formula $[(C_2H_5O)_3Si(CH_2)_3S]_2$, is well-known; it is sold by Degussa under the names Si266 or Si75 (in the latter case, in the form of a mixture of disulfide (75% by weight) and of polysulfides), or alternatively by Osi Specialties under the name Silquest A1589.

The disulfide homologue of TESPT, this TESPD therefore has the developed formula (x close to 2):

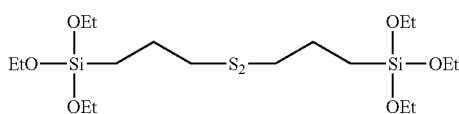

In this test the TESPD sold by Degussa under the name "Si75" (average x equal to 2.35 according to the supplier's data sheet) is used.

The second disulfide (MESPD), of formula $[(C_2H_5O)(CH_3)_2Si(CH_2)_3S]_2$, was described in patent application EP-A-1 043 357 and embodied in rubber compositions intended for the manufacture of tires. In that application, the MESPD is presented as a potential replacement for TESPD, which can be used without degradation of the mechanical properties (and therefore of the level of reinforcement), which is advantageous from the environmental point of view owing to a reduced number of ethoxy functions (only one per silicon atom, instead of three) and consequently to a lesser release of ethanol during the processing of the rubber compositions (a known problem with VOCs—"Volatile Organic Compounds").

The disulfide homologue of MESPT, this MESPD has the developed formula (x close to 2):

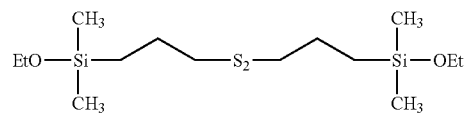

As this product is not commercially available, in this test the compound MESPD synthesised in accordance with section III-1.B) is used.

It will be noted that the two structures above (TESPD and MESPD) are on one hand very close to one another, and on the other hand are close to that of the MESPT of formula (III), the latter differing in particular from MESPD only by the presence of a tetrasulfide group $S_4$ instead of the disulfide group $S_2$.

For this test three compositions based on diene elastomers (blend of SSBR and BR) reinforced with silica, referred to as C-3 to C-5 are prepared, these three compositions being intended for treads for passenger-car tires. These three compositions are identical with the exception of the coupling agent used:

composition C-3: MESPT (invention);
composition C-4: TESPD (control);
composition C-5: MESPD (control).

As previously, the three alkoxysilanes are used in a substantially isomolar amount of silicon, their content of less than 6 phr advantageously representing less than 8% by weight relative to the quantity of reinforcing inorganic filler. The amount of MESPT in composition C-3 represents approximately $9 \times 10^{-7}$ moles per meter squared of inorganic filler (silica).

Figure 2:
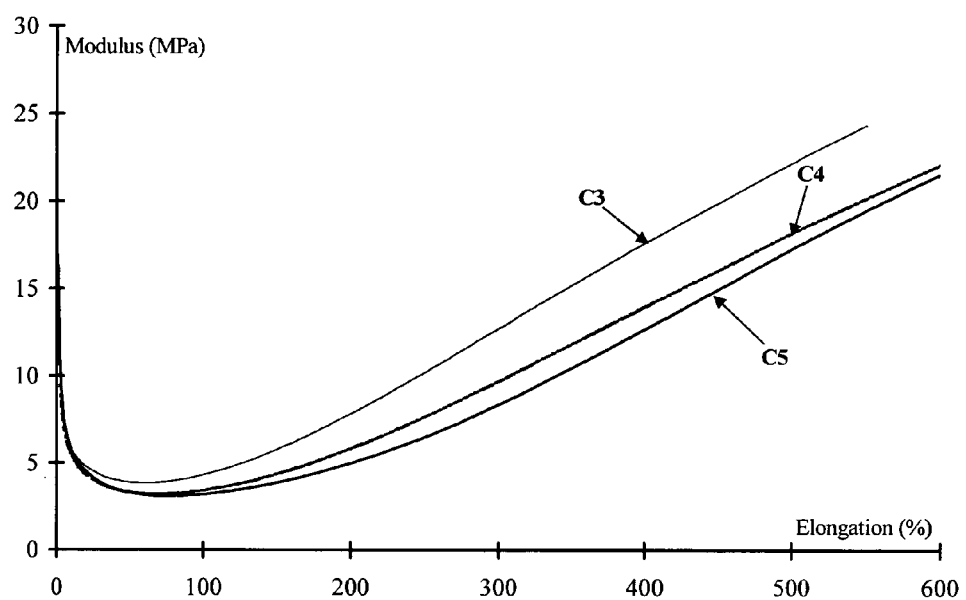

Tables 4 and 5 show the formulation of the three compositions (Table 4—amounts of the different products expressed in phr), and their properties before and after curing (30 min at 150° C.); the vulcanization system is formed of sulfur and sulfenamide. The attached FIG. 2 shows the curves of modulus as a function of elongation, these curves being marked C3 to C5, and corresponding to compositions C-3 to C-5 respectively.

Examining the different results of Table 5 clearly demonstrates that the composition according to the invention C-3, based on MESPT, has the best compromise of properties compared with the two control compositions C-4 and C-5, both before and after curing, with:

a lower viscosity in the uncured state than that of composition C-4 (TESPD), substantially identical to that of composition C-5 (MESPD);

a distinctly shorter time T5, in particular relative to composition C-5 (MESPD), while being sufficiently long (20 min) to offer an appropriate safety margin with respect to the problem of scorching;

by far the highest conversion rate constant K (0.462 $min^{-1}$), coupled with a relatively long induction time $t_i$ (10 min) and with the shortest vulcanization times (15 and 20 min to achieve respectively 90% and 99% of the maximum torque), all characteristics which are particularly favourable to industrial conditions of curing of the tires or their treads;

a higher Shore hardness, which, for a tread, is rather favourable to the road behaviour of the tire on dry ground;

values of moduli at high deformation (ME100 and ME300) and a ratio (M300/M100) which are distinctly higher, all clear indicators to the person skilled in the art of improved reinforcement;

finally, by far the most advantageous hysteresis properties, as illustrated by distinctly lower values of HL and $\tan(\delta)_{max}$, which are synonymous with reduced rolling resistance.

The curves of the attached FIG. 2 confirm, if it were needed, the superiority of the composition according to the invention: curve C3 located well above the curves C4 and C5 for the high elongations (100% and more), all the more so as the elongation increases, which is representative in known manner of superior reinforcement, and hence a superior ability of composition C-3 to resist wear.

In summary, the coupling agent MESPT, the superiority of which has already been demonstrated relative to the control TESPT (Tests 1 and 2 above), proves here to be very distinctly superior to the other two polysulfurized (disulfurized) ethoxysilanes tested here, namely TESPD and MESPD.

D) Test4

This test confirms the superiority of MESPT compared with the control MESPD in an elastomeric matrix different from the previous ones, comprising as reinforcing filler a blend (close to 50/50 by weight) of carbon black (N234) and silica, the amount of total reinforcing filler being 85 phr.

The two rubber compositions prepared for this test, which are intended for treads for passenger-car tires, are identical with the exception of the coupling agent used:

composition C-6: MESPT (invention);
composition C-7: MESPD (control).

The two monoethoxysilanes are used in an amount less than 3 phr (substantially isomolar amount of silicon), this quantity representing less than 8% by weight relative to the quantity of reinforcing inorganic filler. The amount of MESPT in composition C-6 represents approximately $9 \times 10^{-7}$ moles per meter squared of inorganic filler.

Tables 6 and 7 show the formulation of the two compositions, and their properties after curing (30 min at 150° C.).

The results of Table 7 once again confirm the superiority of the tetrasulfurized monoethoxysilane (MESPT) compared with the disulfurized monoethoxysilane (MESPD), with in particular:

a greater Shore hardness;

distinctly higher moduli ME100, ME300 and a ratio ME300/ME100, indicators of a higher level of reinforcement (more effective coupling), and correlatively of better wear resistance for a tread incorporating the composition according to the invention;

finally, an improved hysteresis (lower HL and $\tan(\delta)_{max}$), in other words lesser rolling resistance, which is synonymous with reduced fuel consumption.

As for the vulcanization kinetics of the compositions tested, it proved in this test that they in both cases, owing to a known accelerating effect of carbon black, covered values identical to those usually observed on conventional compositions filled exclusively with carbon black (constant K within in a range from approximately 0.45 to 0.55 min$^{-1}$), of course with an "equivalent" rubber formulation (that is to say, one typical of a passenger-car tire tread); however, composition C-6 according to the invention also demonstrated superiority relative to the control composition C-7.

E) Test 5

In this test, two compositions similar to those of Test 1 above were prepared, referenced C-8 and C-9, with the difference that the mixer used this time is an industrial-size mixer.

The two compositions are identical, with the exception of the coupling agent used:

composition C-8: TESPT (control);
composition C-9: MESPT (invention).

The MESPT is synthesised in accordance with the specifications of section III-1.A) but in a larger quantity. The amounts of the different constituents used, in particular elastomer, reinforcing inorganic filler and coupling agent, are the same as for Test 1 above. Tables 8 and 9 show the formulation of the two compositions, and their properties before and after curing (30 min at 150° C.).

Examination of the different results of Table 9 confirms the improved performances of the composition based on MESPT, compared with the control composition using TESPT, under industrial preparation conditions, with in particular for the composition according to the invention:

a conversion rate constant K multiplied by two;

a maximum torque achieved in a distinctly shorter time (see $t_{90}$), the total vulcanization time ($t_{90}-t_i$) being reduced by half compared with the control;

higher values of moduli at high deformation ME100, ME300 and of ratio ME300/ME100 (superior reinforcement);

improved hysteresis properties, as illustrated by significantly lower values (less 10 to 15%) of the losses HL and of $\tan(\delta)_{max}$, which already indicates a reduced rolling resistance.

In other words, the curing of the composition according to the invention may be effected in a distinctly shorter time, without adversely affecting, and even improving, the reinforcement and hysteresis performances.

The superiority of the invention relative to the control solution is thus confirmed, this time on an industrial scale.

F) Test 6

The above compositions C-8 and C-9 are used in this test as treads for passenger-car tires having a radial carcass, of dimension 195/65 R15 (speed index H), which are conventionally manufactured and identical in all points except for the rubber composition constituting the tread: composition C-8 for the control tires (P-8), composition C-9 for the tires of the invention (P-9).

The tires are first of all tested on a machine to determine their rolling resistance and their drift thrust, then mounted on a vehicle for the rest of the tests.

Then they are subjected to on-road travel on a passenger car of the marque Peugeot 406, in order to determine their wear resistance.

Finally, they are mounted on another passenger vehicle (marque Renault Laguna—rated pressures at front and rear) to be subjected to the braking and grip tests described in section I-3, under the following specific conditions:

braking (on dry or damp ground): the tires to be tested are mounted at the front of the vehicle;

travel on a damp circuit comprising bends: the tires to be tested are mounted at the front and at the rear of the vehicle.

All the running tests and results are summarised in Table 10. It will be noted that the tires P-9 according to the invention, compared with the control tires, have performances which are at least identical, if not superior, as far as the following are concerned:

the rolling resistance (improvement of 2%);
braking on dry ground (improvement of 3%);
behaviour on a damp circuit comprising bends under limit speed conditions, illustrated by the minimum time taken to complete one lap of the circuit (significant improvement of 0.5 sec);
the reduction of 1% as far as the braking on damp ground is concerned not being judged to be significant, taking into account the accuracy of the test.

In summary, composition C-9 of the invention, compared with the control composition C-8, has improved curing properties while imparting to the tires a compromise of running properties which is improved overall as well. This broadly confirms the results of Test 2 above.

G) Test 7

In this test, as indicated previously for Test 5 (i.e. under industrial conditions), two new compositions C-10 and C-11 identical to those of Test 5 above, with the difference that the diene elastomer used is here a blend of two different SBRs, are prepared.

The two compositions are identical, with the exception of the coupling agent used:
composition C-10: TESPT (control);
composition C-11: MESPT (invention).

Tables 11 and 12 show the formulation of the two compositions, and their properties before and after curing (30 min at 150° C.).

Examination of the different results of Table 12 confirms once again the improved performances of the composition based on MESPT, compared with the control composition using TESPT, with in particular for composition C-11 according to the invention:
a conversion rate constant K twice as great (multiplied by 2.08);
a maximum torque achieved in a shorter time (see $t_{90}$), the total vulcanization time ($t_{90}$-$t_i$) here again being reduced by half compared with the control;
higher values of moduli at high deformation ME100, ME300 and of ratio ME300/ME100 (superior reinforcement);
improved hysteresis properties, as illustrated by significantly lower values (less 12 to 16%) of the losses HL and of $\tan(\delta)_{max}$, which are favourable to the rolling resistance.

The compositions C-10 and C-11 are then tested as treads for passenger-car tires having a radial carcass, which are conventionally manufactured and identical in all points except for the rubber composition constituting the tread: composition C-10 for the control tires (P-10) composition C-11 for the tires of the invention (P-11).

All the tests are carried out in accordance with the detailed specifications of Test 6 above. All the running results are summarised in Table 13. It will be noted that the tires P-11 according to the invention have a performance at least identical if not slightly superior as far as in particular the behaviour on a damp circuit comprising bends under limit speed conditions, illustrated by the minimum time to complete one lap of the circuit (significant improvement of 0.5 sec), is concerned.

H) Test 8

This test this time confirms the superiority of the MESPT compared with the MESPD control, in two rubber compositions similar to compositions C-3 and C-5 of Test 3 above, except that the two compositions of the present test are prepared in a large quantity, in an industrial mixer, as for Tests 5 and 7 above.

The two rubber compositions, which are intended for treads for passenger-car tires, are identical with the exception of the coupling agent used:
composition C-12: MESPT (invention);
composition C-13: MESPD (control).

Tables 14 and 15 show the formulation of the two compositions, and their properties before and after curing (30 min at 150° C.).

The results of Table 15 confirm, under industrial conditions, the superiority of the tetrasulfurized monoethoxysilane (MESPT) compared with the disulfurized monoethoxysilane (MESPD), with in particular:
a distinctly higher conversion rate constant K, a reduced total vulcanization time ($t_{90}$-$t_i$), a higher BR value ("Bound rubber");
after curing, higher Shore hardness, moduli ME100, ME300 and a ratio ME300/ME100, but also an improved hysteresis (HL and $\tan(\delta)_{max}$ distinctly lower, which is synonymous with improved rolling resistance).

Measurements of rolling resistance carried out in accordance with section I-3-A) in fact exhibited a significant improvement, of the order of 5%, in the case of the invention, compared with the control solution.

I) Test 9

This test confirms the superiority of the MESPT compared with the TESPT control, in two new rubber compositions, prepared under industrial conditions as for Tests 5 to 8 above.

These compositions are characterised by the fact that they are reinforced by a silica of lower BET specific surface area (approximately 110 m²/g), compared with that of the preceding tests.

The two rubber compositions, which are intended for treads for passenger-car tires, are identical with the exception of the coupling agent used:
composition C-14: TESPT (control);
composition C-15: MESPT (invention).

Tables 16 and 17 show the formulation of the two compositions, and their properties after curing (30 min at 150° C.).

The results of Table 17 clearly demonstrate, in the presence of a different reinforcing inorganic filler, the superiority of the monoethoxysilane compared with the triethoxysilane, with in particular:
a very much higher conversion rate constant K (multiplied by 2.6),
a maximum torque achieved in a distinctly shorter time (see $t_{90}$), the total vulcanization time ($t_{90}$-$t_i$) being reduced by half compared with the control;
a slightly greater Shore hardness;
higher moduli ME100 and ME300,
an improved hysteresis (lower HL and $\tan(\delta)_{max}$).

It will be noted in particular that, unexpectedly, in the presence of a reinforcing inorganic filler such as silica of lower BET specific surface area, less than 130 m²/g, the replacement of the conventional TESPT with the MESPT is accompanied by an increase in the conversion rate K which is even greater than that observed in the preceding tests for a reinforcing silica of greater specific surface area (approximately 160 m²/g).

J) Test 10

This latter test finally confirms the superiority of the MESPT compared with the TESPT control, in two new rubber compositions, this time based on natural rubber, intended for treads for heavy-vehicle tires.

These two compositions are identical with the exception of the coupling agent used:
  composition C-16: TESPT (control);
  composition C-17: MESPT (invention).

Tables 18 and 19 show the formulation of the two compositions, and their properties after curing (30 min at 150° C.). The results of Table 19 confirm once again, in the presence of a diene elastomer of different nature, the superiority of the monoethoxysilane coupling agent, compared with the reference coupling agent triethoxysilane, with in particular:
  a higher conversion rate constant K;
  a maximum torque achieved in a shorter time (see $t_{90}$), a reduced total vulcanization time ($t_{90}-t_i$);
  a greater Shore hardness;
  higher moduli ME100 and ME300;
  an improved hysteresis (lower HL and $\tan(\delta)_{max}$).

In summary, all the results of the preceding tests clearly illustrate an improved overall behaviour of the compositions, tires or treads based on a reinforcing inorganic filler and MESPT as coupling agent, whatever the nature of the diene elastomer or the reinforcing inorganic filler used.

Not only is a high quality of coupling observed between the reinforcing inorganic filler and diene elastomer, which is at least equal to if not greater than that available hitherto with the reference coupling agent TESPT, as illustrated in numerous examples by improved values of reinforcement and hysteresis.

But also and above all, unpredictably, rheometric properties which are very distinctly improved are obtained, in particular a vulcanization kinetics substantially brought back to the level known for compositions filled conventionally with carbon black.

This result is all the more unexpected for the person skilled in the art since the recent prior art had encouraged him more to direct his efforts towards alkoxysilanes of the disulfurized type such as TESPD or MESPD, owing to the known difficulties of processing in the uncured state, linked with the risk of scorching, of the rubber compositions using the tetrasulfarized versions, such as TESPT, of these alkoxysilanes (see in particular EP-A-732 362 or U.S. Pat. No. 5,580,919, EP-A-773 224 or U.S. Pat. No. 5,663,395, EP-A-785 206 or U.S. Pat. No. 5,663,358, EP-A-895 996 or U.S. Pat. No. 5,892,085, or alternatively the aforementioned application EP-A-1 043 357).

The invention finds particularly advantageous applications in "Green Tires" of low energy consumption and in their treads, which have both a low hysteresis (low rolling resistance) and high wear resistance, as well as high grip properties on wet, snow-covered or icy ground, in particular when these tires and treads are intended for passenger vehicles, motorcycles or industrial vehicles of the heavy-vehicle type.

TABLE 1

| Composition No. | C-1 | C-2 |
| --- | --- | --- |
| SBR (1) | 82.5 | 82.5 |
| BR (2) | 30 | 30 |
| silica (3) | 80 | 80 |
| carbon black (4) | 6 | 6 |
| aromatic oil (5) | 20.5 | 20.5 |
| TESPT (6) | 6.4 | — |
| MESPT (7) | — | 5.0 |
| DPG (8) | 1.5 | 1.5 |
| ZnO | 2.5 | 2.5 |
| stearic acid | 2 | 2 |

TABLE 1-continued

| Composition No. | C-1 | C-2 |
| --- | --- | --- |
| paraffin (9) | 1.5 | 1.5 |
| antioxidant (10) | 1.9 | 1.9 |
| sulfur | 1.1 | 1.1 |
| accelerator (11) | 2 | 2 |

(1) SSBR with 59.5% of 1–2 polybutadiene units; 26.5% of styrene; Tg = −29° C.; 70 phr dry SBR extended with 18% by weight of aromatic oil (namely a total of SSBR + oil equal to 82.5 phr);
(2) BR with 4.3% of 1–2; 2.7% of trans; 93% of cis 1–4 (Tg = −106° C.);
(3) silica type "HDS" - Zeosil 1165 MP from Rhodia in the form of microbeads (BET and CTAB: approximately 150–160 m$^2$/g);
(4) carbon black N234;
(5) aromatic oil in free form ("Enerflex 65" from BP);
(6) TESPT ("Si69" from Degussa);
(7) MESPT (synthesised in accordance with section III-1.A);
(8) diphenylguanidine ("Vulcacit D" from Bayer);
(9) mixture of macro- and microcrystalline anti-ozone waxes;
(10) N-1,3-dimethylbutyl-N-phenyl-para-phenylenediamine ("Santoflex" 6-PPD from Flexsys);
(11) N-cyclohexyl-2-benzothiazyl sulfenamide (Flexsys: "Santocure" CBS).

TABLE 2

| Composition No. | C-1 | C-2 |
| --- | --- | --- |
| Properties before curing: | | |
| Mooney (MU) | 97.1 | 89.5 |
| T5 (min) | 18 | 21 |
| BR (%) | 40.5 | 43.3 |
| $t_i$ (min) | 6.0 | 9.7 |
| $t_{90}$ (min) | 17.2 | 14.9 |
| $t_{90} - t_i$ (min) | 11.2 | 5.2 |
| $t_{99}$ (min) | 28.3 | 20.0 |
| $t_{99} - t_i$ (min) | 22.3 | 10.3 |
| K (min$^{-1}$) | 0.206 | 0.446 |
| Properties after curing: | | |
| Shore hardness | 68 | 69 |
| ME10 (MPa) | 5.8 | 5.9 |
| ME100 (MPa) | 1.8 | 2.0 |
| ME300 (MPa) | 2.1 | 2.5 |
| ME300/ME100 | 1.19 | 1.22 |
| HL (%) | 30.1 | 25.9 |
| tan $(\delta)_{max}$ (40° C.) | 0.302 | 0.268 |
| breaking stress (MPa) | 21.4 | 21.8 |
| elongation at break (%) | 570 | 550 |

TABLE 3

| Properties (in relative units) | P-1 | P-2 |
| --- | --- | --- |
| rolling resistance | 100 | 104 |
| wear resistance | 100 | 102 |

(a value greater than 100 indicates a performance which is improved compared with the control - base 100)

TABLE 4

| Composition No. | C-3 | C-4 | C-5 |
| --- | --- | --- | --- |
| SBR (1) | 82.5 | 82.5 | 82.5 |
| BR (2) | 30 | 30 | 30 |
| silica (3) | 80 | 80 | 80 |
| carbon black (4) | 6 | 6 | 6 |
| aromatic oil (5) | 20.5 | 20.5 | 20.5 |
| MESPT (7) | 5.0 | — | — |
| TESPD (12) | — | 5.6 | — |
| MESPD (13) | — | — | 4.4 |
| DPG | 1.5 | 1.5 | 1.5 |
| ZnO | 2.5 | 2.5 | 2.5 |

TABLE 4-continued

| Composition No. | C-3 | C-4 | C-5 |
|---|---|---|---|
| stearic acid | 2 | 2 | 2 |
| paraffin (9) | 1.5 | 1.5 | 1.5 |
| antioxidant (10) | 1.9 | 1.9 | 1.9 |
| sulfur | 1.1 | 1.1 | 1.1 |
| accelerator (11) | 2 | 2 | 2 |

(1) to (11) idem Table 1;
(12) TESPD (Si75 from Degussa);
(13) MESPD (synthesised in accordance with section III-1.B).

TABLE 5

| Composition No. | C-3 | C-4 | C-5 |
|---|---|---|---|
| Properties before curing: | | | |
| Mooney (MU) | 81.6 | 88.3 | 79.0 |
| T5 (min) | 20 | 25 | 35 |
| $t_i$ (min) | 10.0 | 6.0 | 12.5 |
| $t_{90}$ (min) | 15.1 | 18.8 | 19.4 |
| $t_{90} - t_i$ (min) | 5.1 | 12.8 | 6.9 |
| $t_{99}$ (min) | 20.4 | 31.7 | 26.2 |
| $t_{99} - t_i$ (min) | 10.4 | 25.7 | 13.7 |
| K ($min^{-1}$) | 0.462 | 0.179 | 0.334 |
| Properties after curing: | | | |
| Shore hardness | 69 | 65 | 65 |
| ME10 (MPa) | 5.4 | 5.3 | 4.8 |
| ME100 (MPa) | 1.9 | 1.4 | 1.5 |
| ME300 (MPa) | 2.3 | 1.5 | 1.5 |
| ME300/ME100 | 1.21 | 1.07 | 0.99 |
| HL (%) | 26.5 | 35.6 | 31.7 |
| $tan(\delta)_{max}$ (40° C.) | 0.268 | 0.315 | 0.294 |
| breaking stress (MPa) | 20.6 | 20.9 | 20.9 |
| elongation at break (%) | 550 | 680 | 660 |

TABLE 6

| Composition No. | C-6 | C-7 |
|---|---|---|
| SBR (1) | 82.5 | 82.5 |
| BR (2) | 30 | 30 |
| silica (3) | 40 | 40 |
| carbon black (4) | 45 | 45 |
| aromatic oil (5) | 20.5 | 20.5 |
| MESPT (7) | 2.5 | — |
| MESPD (12) | — | 2.2 |
| DPG (8) | 0.75 | 0.75 |
| ZnO | 2.5 | 2.5 |
| stearic acid | 2 | 2 |
| paraffin (9) | 1.5 | 1.5 |
| antioxidant (10) | 1.9 | 1.9 |
| sulfur | 1.1 | 1.1 |
| accelerator (11) | 2 | 2 |

(1) to (12) idem previous tables.

TABLE 7

| Composition No. | C-6 | C-7 |
|---|---|---|
| Properties after curing: | | |
| Shore hardness | 67 | 65 |
| ME10 (MPa) | 5.2 | 4.9 |
| ME100 (MPa) | 1.85 | 1.6 |
| ME300 (MPa) | 2.2 | 1.7 |
| ME300/ME100 | 1.19 | 1.12 |
| HL (%) | 34.6 | 39.6 |
| $tan(\delta)_{max}$ (40° C.) | 0.365 | 0.380 |

TABLE 7-continued

| Composition No. | C-6 | C-7 |
|---|---|---|
| breaking stress (MPa) | 19.2 | 18.7 |
| elongation at break (%) | 560 | 650 |

TABLE 8

| Composition No. | C-8 | C-9 |
|---|---|---|
| SBR (1) | 82.5 | 82.5 |
| BR (2) | 30 | 30 |
| silica (3) | 80 | 80 |
| carbon black (4) | 6 | 6 |
| aromatic oil (5) | 20.0 | 20.0 |
| TESPT (6) | 6.4 | — |
| MESPT (7) | — | 5.0 |
| DPG (8) | 1.5 | 1.5 |
| ZnO | 2.5 | 2.5 |
| stearic acid | 2 | 2 |
| paraffin (9) | 1.5 | 1.5 |
| antioxidant (10) | 2.0 | 2.0 |
| sulfur | 1.1 | 1.1 |
| accelerator (11) | 2.0 | 2.0 |

(1) to (11) idem previous tables.

TABLE 9

| Composition No. | C-8 | C-9 |
|---|---|---|
| Properties before curing: | | |
| Mooney (MU) | 110 | 107 |
| T5 (min) | 22 | 19 |
| $t_i$ (min) | 10.6 | 10.1 |
| $t_{90}$ (min) | 24.6 | 17.2 |
| $t_{90} - t_i$ (min) | 14 | 7.1 |
| K ($min^{-1}$) | 0.16 | 0.32 |
| Properties after curing: | | |
| Shore hardness | 65 | 67 |
| ME10 (MPa) | 5.2 | 5.3 |
| ME100 (MPa) | 1.7 | 1.9 |
| ME300 (MPa) | 2.1 | 2.5 |
| ME300/ME100 | 1.24 | 1.32 |
| HL (%) | 28.9 | 25.1 |
| $tan(\delta)_{max}$(40° C.) | 0.274 | 0.248 |
| breaking stress (MPa) | 23.9 | 23.3 |
| elongation at break (%) | 600 | 570 |

TABLE 10

| Properties (in relative units) | P-8 | P-9 |
|---|---|---|
| Rolling resistance: | 100 | 102 |
| Wear resistance: | 100 | 100 |
| Drift thrust: | 100 | 100 |
| Braking on dry ground: | 100 | 103 |
| Braking on damp ground: | 100 | 99 |
| Performance on damp circuit comprising bends: | | |
| lap time: | 100 | 100.5 (−0.5 s) |
| behaviour mark: | 100 | 100 |

(a value greater than 100 indicates a performance which is improved compared with the control - base 100)

TABLE 11

| Composition No. | C-10 | C-11 |
|---|---|---|
| SBR (14) | 57.75 | 57.75 |
| SBR (15) | 79.75 | 79.75 |
| silica (3) | 80 | 80 |
| carbon black (4) | 6 | 6 |
| aromatic oil (5) | 4.0 | 4.0 |
| TESPT (6) | 6.4 | — |
| MESPT (7) | — | 5.0 |
| DPG (8) | 1.5 | 1.5 |
| ZnO | 2.5 | 2.5 |
| stearic acid | 2 | 2 |
| paraffin (9) | 1.5 | 1.5 |
| antioxidant (10) | 2.0 | 2.0 |
| sulfur | 1.1 | 1.1 |
| accelerator (11) | 2.0 | 2.0 |

(3) to (11) idem Table 1;
(14) SSBR with 24% of 1–2 polybutadiene units; 40.5% of styrene; Tg = −30° C.;
42 phr dry SBR extended with 37.5% by weight of aromatic oil (namely a total of SSBR + oil equal to 57.75 phr);
(15) SSBR with 5% of 1–2 polybutadiene units; 28% of styrene; Tg = −50° C.;
58 phr dry SBR extended with 37.5% by weight of aromatic oil (namely a total of SSBR + oil equal to 79.75 phr).

TABLE 12

| Composition No. | C-10 | C-11 |
|---|---|---|
| Properties before curing: | | |
| Mooney (MU) | 107 | 108 |
| T$_5$ (min) | 18 | 21 |
| t$_i$ (min) | 9.1 | 12.7 |
| t$_{90}$ (min) | 27.5 | 21.8 |
| t$_{90}$ − t$_i$ (min) | 18.4 | 9.1 |
| K (min$^{-1}$) | 0.12 | 0.25 |
| Properties after curing: | | |
| Shore hardness | 67 | 67 |
| ME10 (MPa) | 5.7 | 5.7 |
| ME100 (MPa) | 1.7 | 1.8 |
| ME300 (MPa) | 2.0 | 2.3 |
| ME300/ME100 | 1.21 | 1.29 |
| HL (%) | 33.5 | 28.1 |
| tan(δ)$_{max}$ (40° C.) | 0.330 | 0.290 |
| breaking stress (MPa) | 27.4 | 27.5 |
| elongation at break (%) | 670 | 640 |

TABLE 13

| Properties (in relative units) | P-10 | P-11 |
|---|---|---|
| Rolling resistance: | 100 | 101 |
| Wear resistance: | 100 | 100 |
| Drift thrust: | 100 | 100 |
| Braking on dry ground: | 100 | 100 |
| Braking on damp ground: | 100 | 101 |
| Performance on damp circuit comprising bends: | | |
| lap time: | 100 | 100.5 (−0.5 s) |
| behaviour mark: | 100 | 100 |

(a value greater than 100 indicates a performance which is improved compared with the control - base 100)

TABLE 14

| Composition No. | C-12 | C-13 |
|---|---|---|
| SBR (1) | 88.5 | 88.5 |
| BR (2) | 25 | 25 |
| silica (3) | 80 | 80 |
| carbon black (4) | 6 | 6 |
| aromatic oil (5) | 20.0 | 20.0 |
| MESPT (7) | 5 | — |
| MESPD (13) | — | 4.4 |
| DPG (8) | 1.5 | 1.5 |
| ZnO | 2.5 | 2.5 |
| stearic acid | 2 | 2 |
| paraffin (9) | 1.5 | 1.5 |
| antioxidant (10) | 2.0 | 2.0 |
| sulfur | 1.1 | 1.1 |
| accelerator (11) | 2.0 | 2.0 |

(1) to (13) idem Table 4.

TABLE 15

| Composition No. | C-12 | C-13 |
|---|---|---|
| Properties before curing: | | |
| Mooney (MU) | 92.5 | 88.5 |
| T5 (min) | 23 | 28.5 |
| BR (%) | 49.2 | 46.3 |
| t$_i$ (min) | 10.2 | 12.5 |
| t$_{90}$ (min) | 18.5 | 24.3 |
| t$_{90}$ − t$_i$ (min) | 8.3 | 11.8 |
| K (min$^{-1}$) | 0.278 | 0.195 |
| Properties after curing: | | |
| Shore hardness | 68 | 65 |
| ME10 (MPa) | 5.8 | 5.0 |
| ME100 (MPa) | 1.7 | 1.6 |
| ME300 (MPa) | 2.1 | 1.7 |
| ME300/ME100 | 1.22 | 1.09 |
| HL (%) | 27.9 | 32.1 |
| tan(δ)$_{max}$ (40° C.) | 0.269 | 0.308 |
| breaking stress (MPa) | 21.2 | 21.4 |
| elongation at break (%) | 620 | 600 |

TABLE 16

| Composition No. | C-14 | C-15 |
|---|---|---|
| SBR (1) | 82.5 | 82.5 |
| BR (2) | 30 | 30 |
| silica (16) | 94 | 94 |
| carbon black (4) | 6 | 6 |
| aromatic oil (5) | 20.0 | 20.0 |
| TESPT (6) | 5.6 | — |
| MESPT (7) | — | 4.8 |
| DPG (8) | 1.5 | 1.5 |
| ZnO | 2.5 | 2.5 |
| stearic acid | 2 | 2 |
| paraffin (9) | 1.5 | 1.5 |
| antioxidant (10) | 2.0 | 2.0 |
| sulfur | 1.1 | 1.1 |
| accelerator (11) | 2.0 | 2.0 |

(1) to (11) idem Table 1;
(16) Silica "HDS" - "Zeosil 1115MP" from Rhodia, in the form of microbeads (BET and CTAB: approximately 110 m$^2$/g).

TABLE 17

| Composition No. | C-14 | C-15 |
|---|---|---|
| Properties before curing: | | |
| Mooney (MU) | 93 | 95 |
| T5 (min) | 25 | 21 |
| BR (%) | 49 | 48 |

TABLE 17-continued

| Composition No. | C-14 | C-15 |
|---|---|---|
| $t_i$ (min) | 9.3 | 6.7 |
| $t_{90}$ (min) | 23 | 13.5 |
| $t_{90} - t_i$ (min) | 13.7 | 6.8 |
| K (min$^{-1}$) | 0.13 | 0.34 |
| Properties after curing: | | |
| Shore hardness | 67 | 69 |
| ME10 (MPa) | 5.7 | 6.0 |
| ME100 (MPa) | 1.8 | 2.1 |
| ME300 (MPa) | 2.3 | 2.6 |
| ME300/ME100 | 1.27 | 1.25 |
| HL (%) | 30.9 | 28.7 |
| tan(δ)$_{max}$ (40° C.) | 0.272 | 0.254 |
| breaking stress (MPa) | 21.1 | 20.2 |
| elongation at break (%) | 600 | 570 |

TABLE 18

| Composition No. | C-16 | C-17 |
|---|---|---|
| NR (17) | 100 | 100 |
| silica (3) | 50 | 50 |
| carbon black (18) | 5 | 5 |
| TESPT (6) | 5 | — |
| MESPT (7) | — | 3.85 |
| ZnO | 3 | 3 |
| stearic acid | 2.5 | 2.5 |
| paraffin (9) | 1 | 1 |
| antioxidant (10) | 2.5 | 2.5 |
| sulfur | 1.5 | 1.5 |
| accelerator (11) | 1.8 | 1.8 |

(3) to (11) idem Table 1;
(17) natural rubber;
(18) carbon black N330.

TABLE 19

| Composition No. | C-16 | C-17 |
|---|---|---|
| Properties before curing: | | |
| Mooney | 77 | 76 |
| T5 (min) | 13 | 10 |
| $t_i$ (min) | 5.3 | 5.9 |
| $t_{90}$ (min) | 13.2 | 11.8 |
| $t_{90} - t_i$ (min) | 7.9 | 5.9 |
| K (min$^{-1}$) | 0.29 | 0.39 |
| Properties after curing: | | |
| Shore hardness | 63.4 | 66.4 |
| ME10 (MPa) | 4.7 | 5.2 |
| ME100 (MPa) | 2.0 | 2.3 |
| ME300 (MPa) | 2.0 | 2.3 |
| ME300/ME100 | 1.0 | 1.0 |
| HL (%) | 14.3 | 12.6 |
| tan(δ)$_{max}$ (60° C.) | 0.076 | 0.068 |
| breaking stress (MPa) | 28.6 | 29.7 |
| elongation at break (%) | 595 | 575 |

We claim:

1. A tire incorporating an elastomeric composition based on a diene elastomer, a reinforcing inorganic filler and a bis-alkoxysilane tetrasulfide, wherein said tetrasulfide of alkoxysilane satisfies the formula (I):

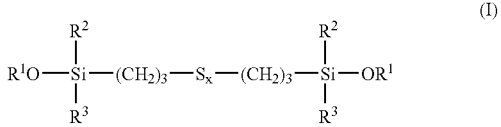

in which:
the symbols $R^1$, which may be identical or different, each represent a monovalent hydrocarbon group selected from the group consisting of alkyls, whether straight-chain or branched, having from 1 to 4 carbon atoms, and alkoxyalkyls, whether straight-chain or branched, having from 2 to 8 carbon atoms;
the symbols $R^2$ and $R^3$, which may be identical or different, each represent a monovalent hydrocarbon group selected from the group consisting of alkyls, whether straight-chain or branched, having from 1 to 6 carbon atoms, and the phenyl radical; and
x is between about 3 and about 5.

2. The tire according to claim 1, wherein:
the symbols $R^1$ are selected from the group consisting of methyl, ethyl, n-propyl, and isopropyl;
$R^2$ and $R^3$ are selected from the group consisting of methyl, ethyl, n-propyl, isopropyl, n-butyl, n-hexyl, and phenyl.

3. The tire according to claim 2, wherein the alkoxysilane is the bis-monoethoxydimethylsilylpropyl tetrasulfide of formula (III):

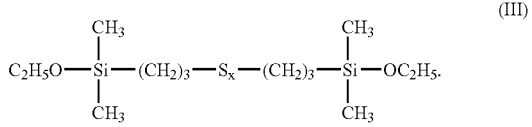

(abbreviated to MESPT)

4. The tire according to claim 3, wherein x lies within a range from about 3.5 to about 4.5.

5. The tire according to claim 1, wherein the diene elastomer is selected from the group consisting of the group consisting of polybutadienes, natural rubber, synthetic polyisoprenes, butadiene copolymers, isoprene copolymers, and mixtures of these elastomers.

6. The tire according to claim 5, wherein the butadiene or isoprene copolymer is selected from the group consisting of the group consisting of butadiene-styrene copolymers, butadiene-isoprene copolymers, isoprene-styrene copolymers, butadiene-styrene-isoprene copolymers, and mixtures of these copolymers.

7. The tire according to claim 5, wherein the diene elastomer is a butadiene-styrene copolymer (SBR) having a styrene content of between about 20% and about 30% by weight, a content of vinyl bonds of the butadiene fraction of between about 15% and about 65%, a content of trans-1,4 bonds of between about 20% and about 75%, and a glass transition temperature of between −20° C. and −55° C.

8. The tire according to claim 7, wherein the SBR is an SBR prepared in solution (SSBR).

9. The tire according to claim 7, wherein the SBR is used in a mixture with a polybutadiene having more than about 90% cis-1,4 bonds.

10. The tire according to claim 5, wherein the diene elastomer is an isoprene elastomer.

11. The tire according to claim 1, wherein the composition comprises between about 10 and about 200 phr (parts by weight per hundred parts of elastomer) of said reinforcing inorganic filler.

12. The tire according to claim 1, wherein the quantity of alkoxysilane is between about 1 and about 20 phr.

13. The tire according to claim 1, wherein the quantity of alkoxysilane represents between about 0.5 and about 20% by weight relative to the quantity of reinforcing inorganic filler.

14. The tire according to claim 1, wherein the inorganic filler has a BET specific surface area of between about 60 and about 250 m²/g.

15. The tire according to claim 1, wherein the inorganic filler comprises between about 50% and up to 100% silica.

16. The tire according to claim 1, wherein the inorganic filler forms the entire reinforcing filler.

17. The tire according to claim 1, wherein the reinforcing inorganic filler is used in a mixture with carbon black.

18. The tire according to claim 17, wherein the carbon black is present in an amount of between about 2 and about 20 phr.

19. The tire according to claim 18, wherein the carbon black is present in an amount within a range from about 5 to about 15 phr.

20. The tire according to claim 1, wherein said elastomeric composition is incorporated in part of the tire selected from among the group consisting of the tread, the underlayers, the crown reinforcement plies, the sidewalls, the carcass reinforcement plies, the beads and the protectors.

21. The tire according to claim 1, wherein said tire is vulcanized.

22. A process for preparing a tire having accelerated vulcanization kinetics, incorporating a sulfur-vulcanizable elastomeric composition based on a reinforcing inorganic filler, wherein said process comprises the following steps:
   incorporating into a diene elastomer, in a mixer:
      a reinforcing inorganic filler;
      a bis-alkoxysilane tetrasulfide;
   thermomechanically kneading the entire mixture, in one or more stages, until a maximum temperature of between about 110° C. and about 190° C. is reached;
   cooling the entire mixture to a temperature of less than about 100° C.;
   then incorporating a vulcanization system;
   kneading the entire mixture until a maximum temperature less than about 110° C. is reached;
   calendering or extruding the elastomeric composition thus obtained in the form of a tire or a rubber profiled element incorporated as semi-finished product in the tire,
wherein said tetrasulfide of alkoxysilane satisfies formula (I):

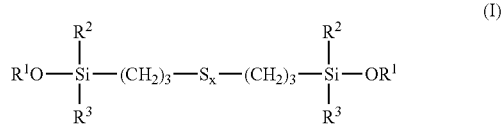

in which:
   the symbols R¹, which may be identical or different, each represent a monovalent hydrocarbon group selected from the group consisting of alkyls, whether straight-chain or branched, having from 1 to 4 carbon atoms and alkoxyalkyls, whether straight-chain or branched, having from 2 to 8 carbon atoms;
   the symbols R² and R³, which may be identical or different, each represent a monovalent hydrocarbon group selected from the group consisting of alkyls, whether straight-chain or branched, having from 1 to 6 carbon atoms and the phenyl radical; and
   x is between about 3 and about 5.

23. The process according to claim 22, wherein:
   the symbols R¹ are selected from the group consisting of methyl, ethyl, n-propyl, and isopropyl;
   R² and R³ are selected from the group consisting of methyl, ethyl, n-propyl, isopropyl, n-butyl, n-hexyl, and phenyl.

24. The process according to claim 23, wherein the alkoxysilane is the bis-monoethoxydimethylsilylpropyl tetrasulfide of formula (III):

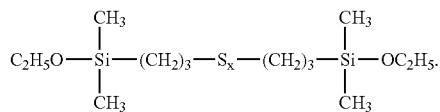

25. The process according to claim 24, wherein x lies within a range from about 3.5 to about 4.5.

26. The process according to claim 22, wherein the diene elastomer is selected from the group consisting of polybutadienes, natural rubber, synthetic polyisoprenes, butadiene copolymers, isoprene copolymers, and mixtures of these elastomers.

27. The process according to claim 22, wherein the quantity of the reinforcing inorganic filler is between about 10 and about 200 phr and the quantity of the alkoxysilane is between about 1 and about 20 phr.

28. The process according to claim 22, wherein the inorganic filler has a BET specific surface area of between about 60 and about 250 m²/g.

29. The process according to claim 22, wherein the inorganic filler comprises between about 50% and up to 100% silica.

30. The process according to claim 22, wherein the inorganic filler forms the entire reinforcing filler.

31. The process according to claim 22, wherein the reinforcing inorganic filler is used in mixture with carbon black.

32. The process according to claim 31, wherein the carbon black is present in an amount of between about 2 and about 20 phr.

33. The process according to claim 32, wherein the carbon black is present in an amount within a range from about 5 to about 15 phr.

34. The process according to claim 22, wherein the maximum kneading temperature is between about 130° C. and about 180° C.

35. The tire according to claim 2, wherein the tetrasulfide of alkoxysilane is selected from the compounds of formulae (II), (III), (IV):

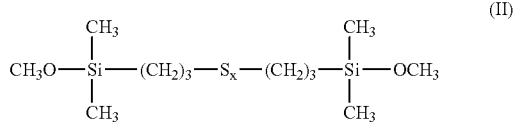

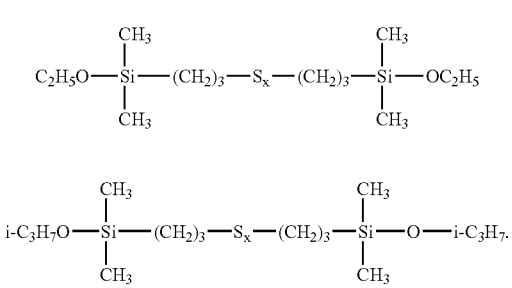

36. The tire according to claim 1, wherein the inorganic filler has a BET specific surface area of less than about 130 m²/g.

37. The tire according to claim 20, wherein said elastomeric composition is incorporated in the tread of the tire.

38. The process according to claim 22, wherein the tetrasulfide of alkoxysilane is selected from the compounds of formulae (II), (III) or (IV):

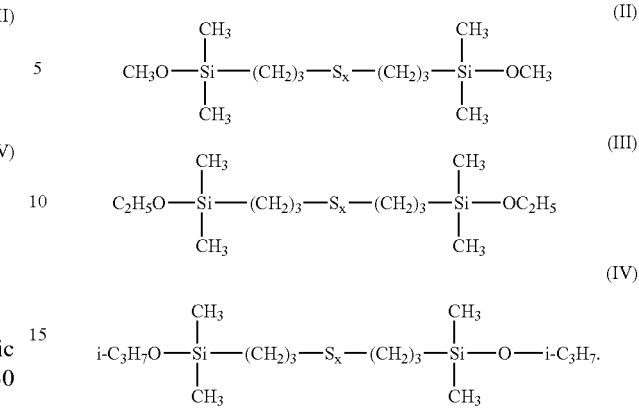

39. The process according to claim 22, wherein the inorganic filler has a BET specific surface area of less than about 130 m²/g.

* * * * *